(12) United States Patent
Kawai et al.

(10) Patent No.: US 6,373,512 B1
(45) Date of Patent: Apr. 16, 2002

(54) PHOTOGRAPHING BOX

(75) Inventors: Satoru Kawai; Mitsuhiro Hamashima; Tatsuya Kita, all of Tokyo (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/607,924

(22) Filed: Jun. 30, 2000

Related U.S. Application Data

(62) Division of application No. 09/099,780, filed on Jun. 19, 1998, now Pat. No. 6,118,545, which is a continuation of application No. 08/248,977, filed on May 25, 1994, now Pat. No. 5,805,780.

(30) Foreign Application Priority Data

| May 25, 1993 | (JP) | ............................................. 5-122643 |
| Jun. 15, 1993 | (JP) | ............................................. 5-143681 |
| Oct. 19, 1993 | (JP) | ............................................. 5-283909 |
| Oct. 19, 1993 | (JP) | ............................................. 5-283910 |
| Oct. 29, 1993 | (JP) | ............................................. 5-292383 |

(51) Int. Cl.[7] .......................... B41J 17/36; B41J 35/36; B41J 29/46; B41J 29/48
(52) U.S. Cl. ....................... 347/215; 347/217; 400/708
(58) Field of Search .................................. 400/708, 211, 400/212, 214; 347/217, 212, 215

(56) References Cited

U.S. PATENT DOCUMENTS

| 4,500,893 A | * | 2/1985 | Sakura et al. |
| 4,864,410 A | | 9/1989 | Andrews et al. |
| 4,959,670 A | | 9/1990 | Thayer, Jr. .................... 354/76 |
| 5,016,035 A | | 5/1991 | Myles, Jr. .................... 354/290 |
| 5,023,638 A | | 6/1991 | Siegesleuthner et al. .... 354/126 |
| 5,072,246 A | | 12/1991 | Thayer et al. ................. 354/78 |

(List continued on next page.)

FOREIGN PATENT DOCUMENTS

| DE | 4408957 | * | 9/1990 | |
| FR | 2 665812 | | 2/1992 | |
| FR | 0 506144 | | 9/1992 | |
| JP | 57-135185 | * | 8/1982 | |
| JP | 59-162078 | | 9/1984 | ............ B41J/29/38 |
| JP | 61-141580 | * | 6/1986 | |
| JP | 62-246770 | * | 10/1987 | |
| JP | 63-212922 | | 9/1988 | ........... G03B/15/00 |
| JP | 1-166969 | | 6/1989 | ............... B41J/3/20 |
| JP | 2-153497 | | 6/1990 | ............ G07F/17/26 |
| JP | 5-4420 | | 1/1993 | ............ B41J/29/08 |
| JP | 5-8426 | | 1/1993 | ............... B41J/2/35 |

OTHER PUBLICATIONS

Patent Abstracts of Japan; vol. 13, No. 434 (M–875) Sep. 28, 1989 & JP A–01 166 969 (Minolta) Jun. 30, 1989.

Patent Abstracts of Japan; vol. 16, No. 477 (M–1320) Oct. 5, 1992 & JP A–04 173 157 (Hitachi) Jun. 19, 1992.

*Primary Examiner*—Huan Tran
(74) *Attorney, Agent, or Firm*—Parkhurst & Wendel, LLP

(57) ABSTRACT

A thermal transfer printer containing a means for feeding a plurality of thermal transfer sheets and a plurality of image receiving sheets, a platen roller placed in the feeding path of the thermal transfer and image receiving sheets, and a recording section with a thermal head with a plurality of heating resistors for selective activation based upon image data to record the image on the image receiving sheets when they and the thermal transfer sheets are forced together by the platen roller so each image receiving sheet is pressed on the thermal head surface by the platen roller. The recording section also has a means to detect when at least one of the thermal transfer and image receiving sheets being recorded are out and a means automatically to exchange the thermal transfer or image receiving sheets with new sheets based upon the detected result.

1 Claim, 19 Drawing Sheets

U.S. PATENT DOCUMENTS

| | | | |
|---|---|---|---|
| 5,196,876 A | 3/1993 | Thayer | 354/76 |
| 5,209,587 A * | 5/1993 | Herbert et al. | 400/225 |
| 5,262,815 A | 11/1993 | Aumiller | 354/290 |
| 5,383,099 A | 1/1995 | Peters | 362/18 |
| 5,446,515 A | 8/1995 | Wolfe et al. | 354/290 |
| 5,500,700 A | 3/1996 | Massarsky | 354/76 |
| 5,528,276 A | 6/1996 | Katsuma | 347/191 |
| 5,539,453 A | 7/1996 | David et al. | |
| 5,589,902 A | 12/1996 | Gruel et al. | 396/3 |
| 5,599,765 A * | 2/1997 | Ohshima et al. | 347/212 |
| 5,623,581 A | 4/1997 | Attenberg | |
| 5,913,019 A | 6/1999 | Attenberg | |

* cited by examiner

PHOTOGRAPHING BOX

This is a Division of application Ser. No. 09/099,780 filed Jun. 19, 1998 now U.S. Pat. No. 6,118,545 which in turn is a continuation of application Ser. No. 08/248,977 filed May 25, 1994, now U.S. Pat. No. 5,805,780.

BACKGROUND OF THE INVENTION

The present invention relates to a photographing box which includes a photographing mechanism for taking the steps of photographing an object such as a figure, perform the necessary processing of the video signal, and print out the picture according to the charges given by a user, end a thermal transfer recording apparatus which is intended to be used as one of several possible ways to the Automatic photographing boxes.

It has been, conventionally known an instant photographing system such as a silver photo system or a diffusing transfer type silver photo system as means for outputing a printed picture after about only a few minutes. The silver photo system needs a few minutes consumed from the end of the photographing to the output of the printed photo and to provide a developing solution and a fixing solution for wet processing. The system therefore has to do a troublesome operation of exchanging the solutions and maintaining the relevant equipment. Further, since the atmospheric temperature is greatly effects the image quality, the temperatures of the solutions are required to be minutely controlled. The diffusing transfer type silver photographing system needs to do a very costly running process.

SUMMARY OF THE INVENTION

It is an object of the present invention to provide a photographing box which provides a sublimation transfer system and operates to output a printed image within about one or two minutes and to be maintained easily and at low cost.

It is a further object of the present invention to provide a monitoring mechanism for the thermal transfer recording which operates to automatically detect trouble in a thermal transfer printer or a system having the thermal transfer printer and give a report about the sensed result.

It is a yet further object of the present invention to provide a thermal transfer recording apparatus which enables to prevent any defective print or failure caused by the adverse effect of paper dust brought about when cutting a dye transfer sheet or dirt intruded from the outside.

It is another object of the present invention to provide an automatic layout mechanism for thermal transfer recording which is arranged to detect if an abnormal state occurs in a thermal head of the thermal transfer printer and obtain a desired recording image if it is sensed.

It is another object of the present invention to provide a thermal transfer printer which enables to prevent disability of printing caused in an out-of-paper state.

In carrying out the above objects, the present invention is arranged as follows.

According to a first aspect of the invention, an automatic photographing box includes a photographing mechanism house for housing a photographing mechanism and a photographing space, the photographing mechanism having means for lighting an object, means for photographing the object illuminated by the lighting means, image processing means for receiving an object image signal from the photographing means and having at least a magnifying or reducing function and an image layouting function, a sublimation transfer printer for receiving a processed image signal and printing the image on the image data signal, and control means for controlling the lighting means, photographing means, image processing means and sublimation transfer printer.

This invention further provides a monitor for displaying an image of an object to be imaged This invention further provides a money handling mechanism and is arranged to generate a start signal from the money handling mechanism.

The photographing box according to the present invention uses a photographing device ouch as a video camera or a still video camera or a leased photographing device and activates the photographing mechanism to image an object, do an image magnification or layout the image of the object, and output plural images on a sheet, each image sized to each way of use such as a license or a passport from the sublimation transfer printer if a user pays for it by any method like cash or a pre-paid card. The photographing box uses the dry process and the heat-sensitive sublimation printer. Hence, it enables to quickly print out the photograph and may be made less costly. Further, the photographing box provides a monitor so that the image may be checked before printing it out and be imaged again.

According to a second aspect of the present invention, a thermal transfer printer for the photographing box providing means for feeding a dye transfer sheet and an image receiving sheet, a thermal head for pressing the dye transfer sheet and the thermal transfer sheet being fed on a head surface by a platen roller, activating plural heating resistors according to the image date, and recording the image on the image receiving sheet, and a thermal head drive control means for transferring image data to the thermal head, includes:

resistance measuring means and resistance abnormality determining means for measuring a resistance of heating resistors of the thermal head, comparing the measured resistance value with the predetermined reference value and the resistance values of the adjacent heating resitors of the thermal heads with each other, determining if the resistance value is abnormal based on the compared result;

means for sensing printing defects;

means for sensing if jamming of the dye transfer sheet or the image receiving sheet takes place by sensing rotation of a feed roll of the dye transfer sheet or the image receiving sheet or rotation of the platen roller;

a micro switch located close to the feeding path of the dye transfer sheet or the image receiving sheet and sensing if the dye transfer sheet or the image receiving sheet is out by the micro switch, means for sensing if the dye transfer sheet or the image receiving sheet is out by sensing the feed roll of the dye transfer sheet or the image receiving sheet or the rotation of the platen roller;

means for sensing the number of left images or used images on the dye transfer sheet, a protective layer transfer sheet, and the image receiving sheet.

This invention provides a photographing mechanism located in the photographing box and having means for lighting an object to be imaged, means for photographing the object illuminated by the lighting means, image processing image for receiving an image signal of the object generated by the photographing means, a thermal transfer printer for receiving an image signal and printing out the image based on the image signal, a money handling mechanism, and control means for controlling the lighting means, photographing means, image processing means, and thermal transfer printer based on a start signal sent from the money handling mechanism, the photographing mechanism including means for sensing the state of the photographing mechanism and means for notifying the sensed result, the sensing means being composed of one or more of means for measuring a resistance of the thermal head, means for sensing a pattern in the printing direction, means for sensing if the dye transfer sheet or the image receiving sheet is out or jammed, means for sensing the number of left images or used images on the dye transfer sheet, the transparent projective layer transfer sheet or the image receiving sheet, means for sensing if the lighting means is burnt out, or means for sensing if changes are out in the money handling mechanism.

This invention is arranged to constantly or occasionally monitor troubles such as an abnormal increase of a resistance or breaking of heating resistors breaking of the thermal head of the thermal transfer printer, an abnormality of the printer like heat resistor breaking of thermal head, out of paper, out of film, jamming, out of changes if the printer applies to the photographing box, or burnt-out of a lighting lamp, and automatically senses such a trouble, if any trouble takes place, and report it to a remote place at a time when such a trouble takes place or periodically. If lots of pieces of information of the photographing boxes located in plural places are allowed to be collected at a business base station, it is possible to take a swift response to any failure or a proper measure to the sensed trouble.

Further, based on the periodical report about the operating condition of each photographing box, each photographing box is allowed to be minutely treated.

According to a third aspect of the invention, a thermal transfer recording apparatus located in the photographing box is composed of means for conveying a dye transfer sheet, means for conveying an image receiving sheet, a printing mechanism including a platen roller and a thermal head for heating plural heating resistors so as to form an image on the image receiving sheet, thus pressing the dye transfer sheet and the image receiving sheet between the platen roller and the thermal head so as to transfer a dye of a color layers provided on the dye transfer sheet to the image receiving sheet, a thermal head driving means for transferring the image data to the thermal heed, and a sheet cutter for cutting the image receiving sheet at predetermined intervals. The thermal transfer recording apparatus is arranged to separate the sheet-cut portion from the image recording section by the partition provided with a slit through which the image receiving sheet is passed and to prevent dirt from being intruded from the sheet cut portion.

The thermal transfer recording apparatus arranged as above operates to prevent intrusion of paper dust brought about when cutting the image-printed image receiving sheet through the effect of the petition. Since the image recording section is structured to prevent dirt, it is possible to prevent the intrusion of the dirt from the outside to the image recording section.

According to a fourth aspect of the invention, in the thermal transfer printer composed of means for feeding a dye transfer sheet, means for feeding an image receiving sheet, a printing mechanism including a platen roller and a thermal head for heating plural heating resistors so as to form an image on the image receiving sheet, thus pressing the dye transfer sheet and the image receiving sheet between the platen roller and the thermal head so as to trusser a dye of a color layers provided on the dye transfer sheet to the image receiving sheet, and a thermal head drive means for at least a platen roller, and a thermal head for recording the image on the image receiving sheet by heating plural heating resistors according to the image data on the image receiving sheet, and further providing a printing mechanism for pressing the dye transfer sheet transferring the image data to the thermal head, an automatic layout mechanism for the photographing box is characterized by providing means for sensing if each heating resistor of the thermal head is abnormal so as to, if the abnormality is sensed, change a printing location of the image so that a desired image may be recorded by only a proper heating resistor.

The automatic layout mechanism arranged as above operates to change the printing location of an image in order to prevent the image printed by the heating resistors if one or more of the heating resistors of the thermal head has a larger resistance or ere broken. Hence, after an abnormality takes place, the automatic layout mechanism enables to record a desired image with no change of density and no printing voids According to a fifth aspect of the invention, in the thermal transfer printer for the photographing box providing an image recording section having means for feeding a dye transfer sheet to be loaded, means for feeding e image receiving sheet to be loaded, a platen roller located on the way of the feeding path of the dye transfer sheet and the image receiving sheet, and a thermal head for pressing the dye transfer sheet and the image receiving sheet being fed on the surface of the platen roller, activating plural heating resistors according to the image data and recording an image on the image receiving sheet, the printer is characterized by allowing plural heat transfer sheets and heated transfer sheets to be respectively loaded, providing means for sensing if at least one of the dye transfer sheet and the image receiving sheet is out and means for automatically exchanging the dye transfer sheet and the image receiving sheet based on this sensed result.

The thermal transfer printer arranged as above operates to detect if the dye transfer sheet or the image receiving sheet is out and automatically exchange the dye transfer sheet or the image receiving sheet with the new one.

According to a further aspect of the invention, in the thermal transfer printer providing a image recording section having means for feeding a thermal transfer sheet to be loaded, means for feeding a image receiving sheet to be loaded, a platen roller located on the way of the feeding path of the thermal transfer sheet and the image receiving sheet, and a thermal head for pressing the thermal transfer sheet and the image receiving sheet being fed on the surface of the platen roller, activating plural heating resistors according to the image data and recording an image on the image receiving sheet.

PREFERRED EMBODIMENTS OF THE PRESENT INVENTION

Figure 1:
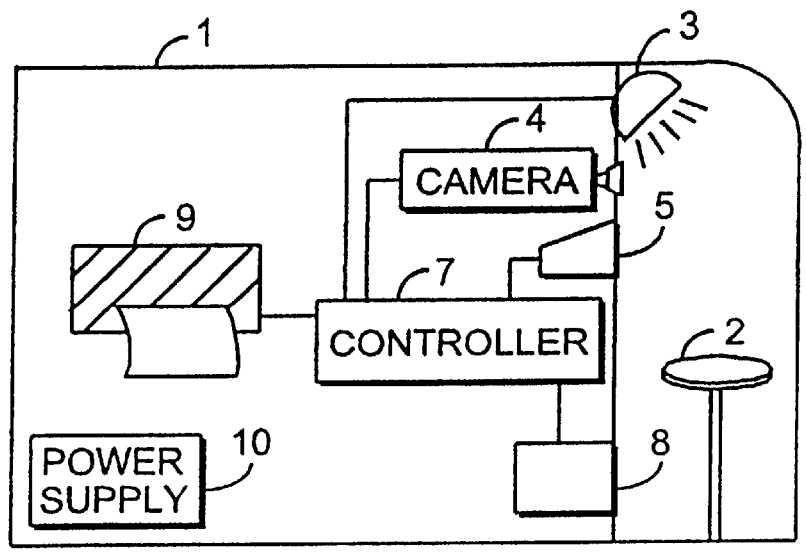
FIG. 1 is a view showing an overall arrangement of a photographing box according to an embodiment of the present invention.

FIG. 1 shows an overall arrangement of a photographing box according to an embodiment of the present invention, in which e numeral 1 denotes a photographing box, a numeral 2 denotes a chair, a numeral 3 denotes a light, a numeral 4 denotes a camera, a numeral 5 denotes a monitor, a numeral 7 denotes a controller, a numeral 8 denotes a money handling machine, a numeral 9 denotes a thermal sublimation transfer printer, and a numeral 10 denotes a power supply.

The photographing box 1 is composed of a housing section for housing a photographing device and a photographing section where a chair or the like is located. In the box 1, the photographing is allowed to be fundamentally done without man's hands.

Figure 2:
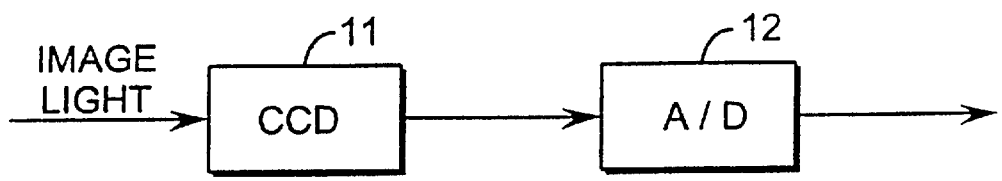
FIG. 2 is a view showing an arrangement of a camera.

In photographing an object, when a user gives a proper fee to the money handling machine 8 by cash or a pre-paid card, the money handling machine 8 operates to send a start signal to the controller 7. In response to the start signal, the controller 7 starts to control the light 3, the camera 4, and the sublimation transfer printer 9. Herein, the start signal is generated when a user pays for the photo. In place of the payment, the start signal may be generated by automatically sensing a figure entered into the photographing box through the effect of an optical sensor or by preparing a start switch to be pressed by a user entered in the photographing box. The power supply 10 operates to feed power to those components At first, the light 3 illuminates a person sitting on the chair 2 so that the person may be imaged by the camera 4. For example, as shown in FIG. 2, the camera 2 is composed of a CCD imaging element 11 and an analog-to-digital converter 12 built therein. The video signal from the CCD is directly analog-to-digital converted into a digital video signal. Herein, the method is used of directly analog-to-digital converting the signal from the CCD into digital video signal for suppressing the image degradation to a minimum. In place, another photographing device such as a commercially available video camera or still video camera may be used. The output video signal may be analog-to-digital converted into the digital signal by any proper means.

Figure 3:
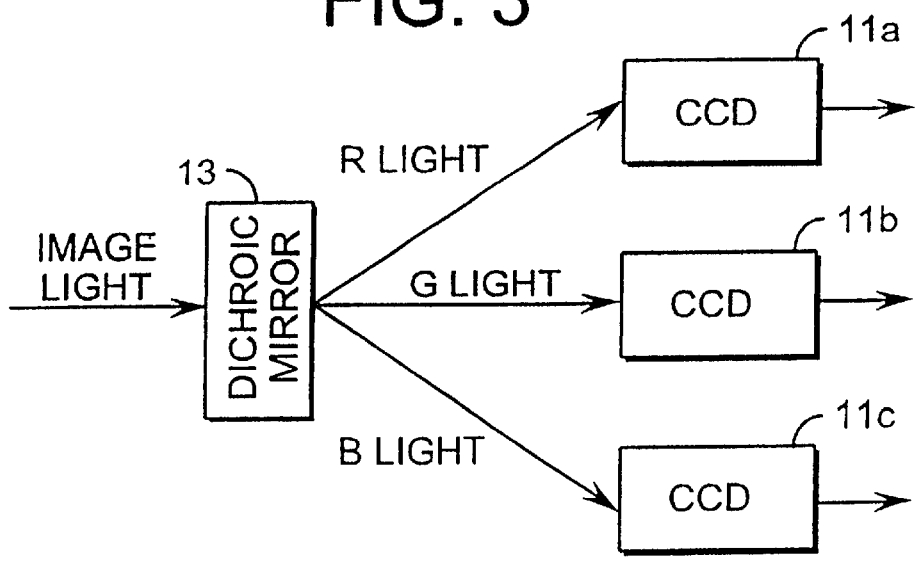
FIG. 3 is an explanatory view showing a photographing method done case of a color image.
Figure 4A:
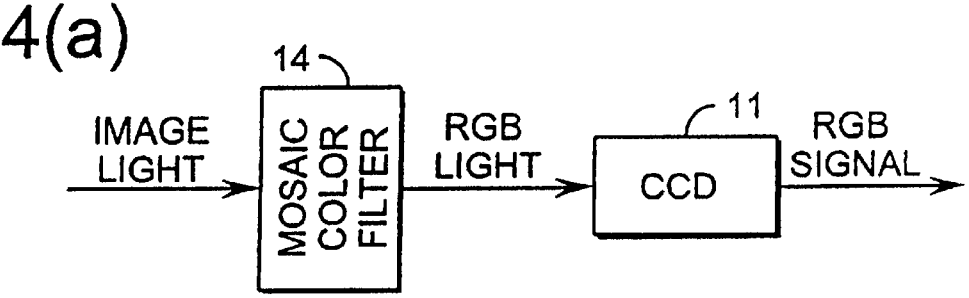
FIGS. 4(a)–4(b) is an explanatory view showing a photographing method done in case of a color image.
Figure 4B:
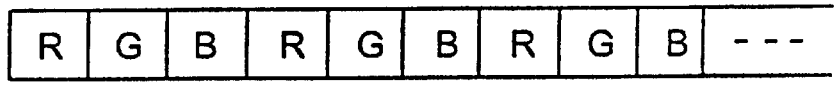

In photographing a color photo, as shown in FIG. 3, the light incident to the imaging device is divided into a red component, a green component and a blue component through the effect of a dichroic mirror. For each of the light components, CCD photographing elements 11a to 11c are prepared for obtaining a video signal for each color light component. Alternately, as shown in FIG. 4A, a mosaic color filter (or stripe filter) 14 is used for separating the image light into R, G and B light components at each pixel. The CCD photographing element 11 serves to obtain each of the R, G and B video signals from each light component as shown in FIG. 4B.

The digital video signal from the camera 4 is received into the controller 7. The controller 7 operates to control the devices and has some image processing functions such as image magnification, sharpness correction, color masking, image layout, or tone correction.

Figure 5A:
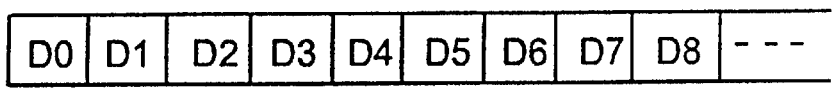
FIGS. 5(c)–5(g) is an explanatory view showing an image magnification.
Figure 5B:
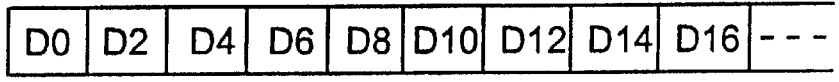
Figure 5C:
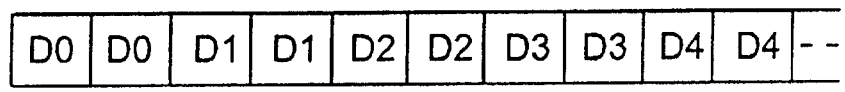

If the image date D0, D1, D2, D3, . . . , as shown in FIG. 5A is obtained, the 50%-reduced image can be realized by thinning D1, D3, D5, . . . , that is, leaving the image data D0, D2, D4, . . . Moreover, as shown in FIG. 5C, the 200%-magnified image can be realized by interpolating D0, D1, D2, D3 . . . in a manner to form an image of D0, D0, D1, D1, D2, D2, D3, D3, . . . The magnification may be set to any value. Any proper method may be used for creating the interpolated data.

Figures 6A, 6B, 7:
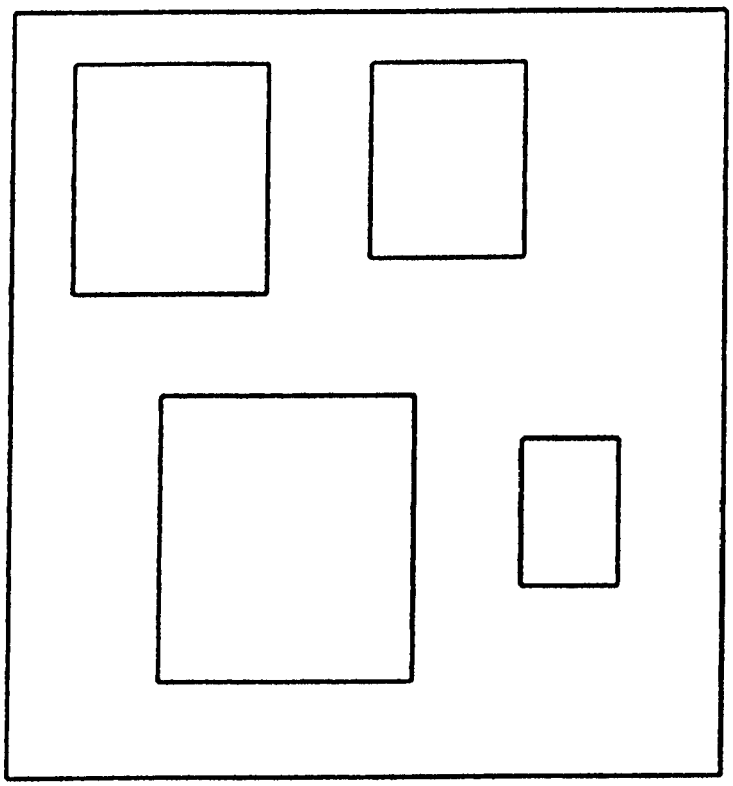
FIGS. 6(a)–6(b) is an explanatory view showing a filter for correcting sharpness.
FIG. 7 is an explanatory view showing an image layout.

The sharpness correction is a process for putting emphasis on the image contour. For example, the filters as shown in FIGS. 6A and 6B are used for adding the contour components extracted by the differentiation to an original image. The resulting image contains emphasized edges.

When the R, G and B signals obtained in the above process are output from a printer, it is necessary to do a process for converting the C, M and Y signals. For example, if the control is done at 256 tones, $$\begin{pmatrix} C \\ M \\ Y \end{pmatrix} = 256 \times \begin{pmatrix} 1-r \\ 1-g \\ 1-b \end{pmatrix}$$

wherein r denotes a value regulated from the obtained R signal and g and b are values regulated in similar manners.

The color masking is a process for removing turbid components of color material for printing. For example, if C. M and Y are obtained as an image data to the printer, the following conversion is done for converting the C. M and Y signals into such C', M' and Y' signals as cancelling the turbid components of the ink.

$$\begin{pmatrix} C' \\ M' \\ Y' \end{pmatrix} = \begin{pmatrix} a1 & a2 & a3 \\ b1 & b2 & b3 \\ c1 & c2 & c3 \end{pmatrix} \begin{pmatrix} C \\ M \\ Y \end{pmatrix}$$

In the above process, the conversion from the R, G and B signals to the C, M and Y signals and the color masking are independently executed. Both of the processes are executed one at a time.

The image layout is a process for arranging a printing layout if the image sized to a way of use obtained by the foregoing image magnification is output with multiple images being placed on one sheet as shown in FIG. 7, concretely, for generating location data of one or more of four corners of each photo. In this case, the size of each photo is understood from the image magnification. Hence, the location data can be generated in a manner to allow the photos not to be overlapped with each other.

Figure 8:
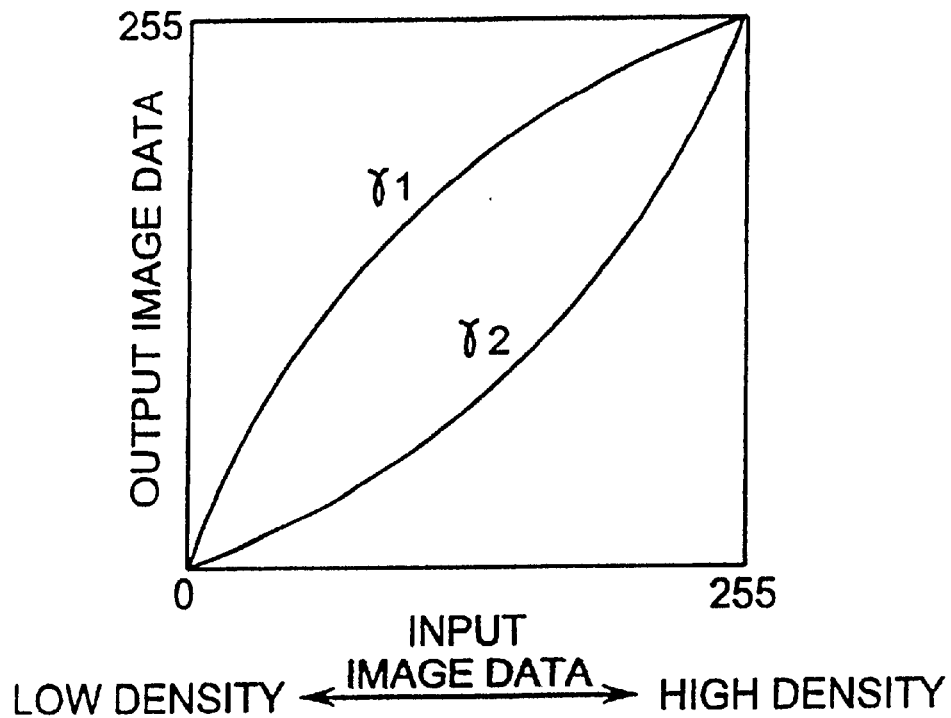
FIG. 8 is an explanatory view showing tone correction.

The tone correction is a process for changing a density is tone (axis of abscissas) of 0 to 255 along the characteristics of y1 and y2 as shown in FIG. 8. For the characteristic of y1, a tone density is corrected for keeping a low density more definitive. For the characteristic of y1, a tone density is corrected for keeping a high density more definitive.

The image date on which the above image process is done is transferred to the sublimation transfer printer 9 and then is printed out.

Figure 9:
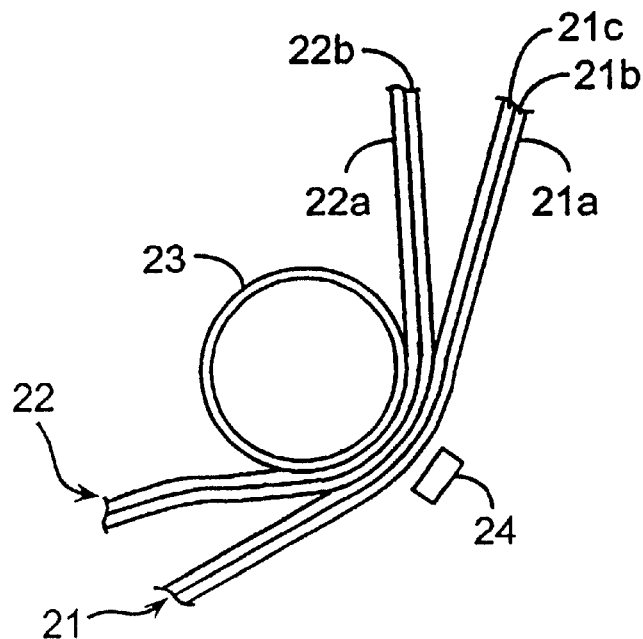
FIG. 9 is an explanatory view showing a sublimation transfer mechanism.

The printing mechanism of the sublimation transfer printer is as shown in FIG. 9.

A thermal transfer sheet 21, a heat resistive layer 21a, a base material 21b, and a dye layer 21c are laminated through a primer laid between the adjacent layers in a manner to keep the adhesion of a coating material onto the base material better. In place of the primer, a adhesion-processed film may be used. As a heat resistive layer 21a, a mixture of polyvinyl butyral, polyisocyanate and phosphate ester is used. As the base material 21b, polyethylene terephthalate or polyimide is used. As the dye layer 21c, a sublimable dye such as indoaniline system, pyrazolone system or azo system and a binder like cellulose system or polyvinylacetale system are used for composition.

An image-receiving sheet 22 is composed of an image-receiving layer 22b and a base material 22a laminated through a primer laid therebetween. The image-receiving layer 22b is made of saturated polyester or vinyl chloride. The base material 22a is composite paper, polyester foam or polypropylene foam. The back side layer is made of binder, lubricant or coating agent. In place, the vinyl chloride sheet itself may be used as the image-receiving layer.

The image-receiving sheet 22 is wound around the platen roller 23. On the sheet 22, the thermal transfer sheet 21 is overlapped. The thermal head 24 comes into contact with the back of the thermal transfer sheet 21 for heating the thermal transfer sheet 21 so that the sublimable dye is heated for transferring it to the image-receiving layer 22b, that is, dyeing the layer 22b. The sublimation transfer device is arranged to transfer the corresponding amount of dye to the energy applied to the thermal head to the image-receiving layer. Hence, the tone according to the heat amount is allowed to be recorded at each pixel dot.

For example, if the silver photo system is used, the temperature change of the developing solution by 1 degree centigrade has a great impact on the image quality. It is therefore necessary to greatly pay for the temperature control. On the other hand, since the present embodiment uses the sublimation transfer recording system as described above, a slight temperature change does not have so much an impact on the image quality. Further, by sensing the environment temperature at a time and properly correcting the influence of temperature, a constant image quality is allowed to be kept over a wide range of temperature.

The image obtained as described above may be checked before it is printed out through the monitor 5. If the user does not like the image displayed on the monitor 5, the user may image the object again. Further, before printing out the object, the location and the composition of the object are allowed to be checked so that the person to be imaged may adjust the location and the construction by himself. At a time, another person may give an indication about the next operation to the person to be imaged as watching the monitor. Or, if any trouble tales place, it may be displayed on the monitor.

As described above, according to the present invention, the thermal sublimation transfer printer is used in the drying process. Hence, the image may be printed out at high speed. Moreover, it does not cost so much in implementing the photographing box. The implemented photographing box is easily maintained. Additional provision of the monitor makes it possible to image the object again by checking the presumable image before printing it out.

Figure 10:
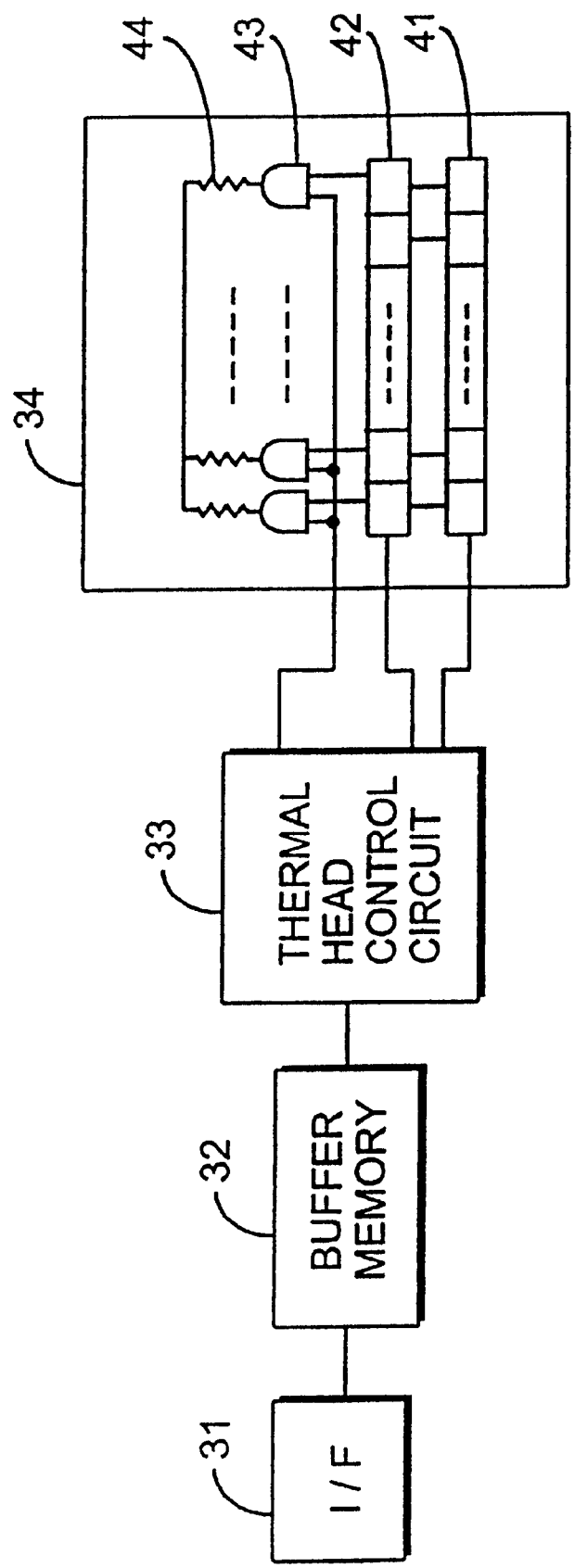
FIG. 10 is an explanatory view showing a thermal head control circuit.

The aforementioned sublimation transfer color printer operates to control a tone (density) according to the times of pulses applied to the corresponding heating resistors of the thermal head, based on the 8-bit multivalued data for each pixel. The tone control will be roughly described with respect to FIG. 10.

For example, the image data is input from an external device such as a host computer to an I/F 31 and then is written in a buffer memory 32. The data written in the buffer memory 32 is read one line by one line in a thermal head control circuit 33 for comparing the data for each line with each value of 1 to 255 at each pixel. At first, the image data of each pixel is compared with "1". As for the image data which is equal to or larger than "1", a value of "1" is put into the location. As for the image data which is smaller than "1", a value of "0" is put into the location. One line composed of pixels is arranged as above. The pulse train as to the pixels on one line is output.

That is, the output from the thermal head control circuit 33 is arranged so that if the image date is equal to or larger than "1", the data location has a value of "1" and the other locations each have a value of "0". This pulse train is set to a shift register 41 included in a thermal head 34 on the controlled timing. The latch circuit 42 serves to latch the data in the shift register in response to a latch signal from the thermal head control circuit 33. During the interval when an enable signal is fed to a gate circuit 43, the heating resistors 44 located for the "1"-latched bits are selectively actuated so that they may be heated for recording the corresponding data. Next, the thermal head control circuit 33 serves to compare the transfer data with a value of "2".

As for the image data which is equal to or larger than "2", a value of "1" is put into the location. As for the image data which is smaller then "2", a value of "0" is put into the location. The control circuit 33 operates to output a pulse train as to one pixel line having such pixel values.

The pulse train from the control circuit 33 is set to the shift register on the controlled timing and then is latched by a latch circuit 42. Like the above case, the heating resistors located for the bits having "1" of the bits included in the latch circuit 42 are actuated for recording the corresponding data. Later, until the compared value reaches the maximum image data "255", the similar operation is repeated. Then, printing out of one line is terminated.

The thermal head used in such a thermal transfer printer has a disadvantage as follows. That is, the heating resistors may have higher resistance or be broken by any possible cause while it is used. In this case, the density may be linearly made lower in the printing direction or the portion to be printed may not appear. Since the line type thermal head is used, for example, if one of the heaters is abnormal, a linear void may appear in the printing direction.

Figure 11:
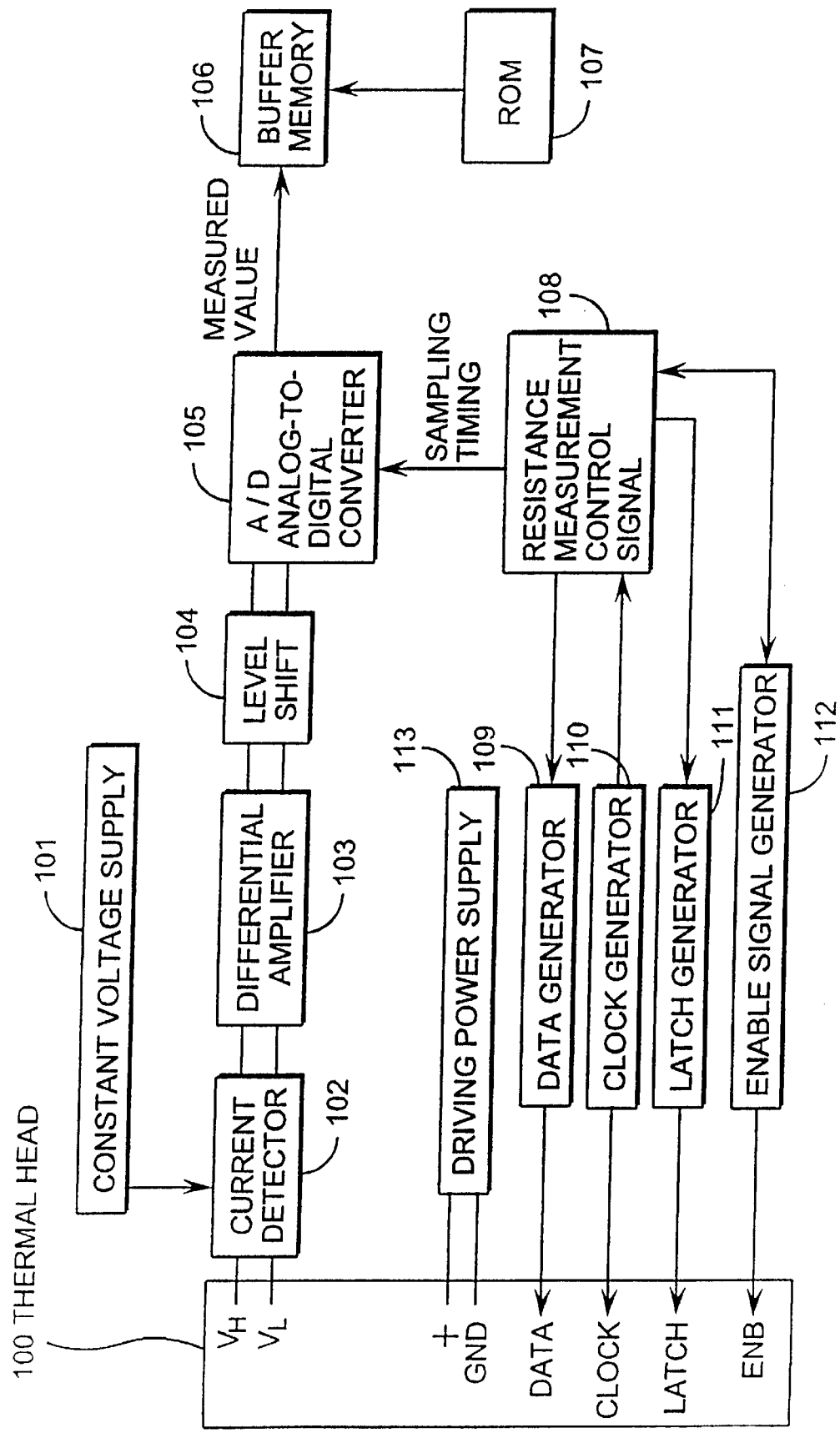
FIG. 11 is a view showing a circuit for measuring a resistance of a heating resistor included in the thermal head.

FIG. 11 is a view showing a resistance measuring circuit for detecting if the heater of the thermal head is abnormal.

The thermal head 100 provides a circuit for controllably driving plural ones or each one of the heating resistors. A driving power supply 113 feeds power to the thermal head 100 and is driven synchronously with a clock generated in a clock generator 110. A data generator 109 operates to generate such data as activating only one heating resistor and transfer it. The latch generator 110 operates to generate a latch signal for latching the data to be transferred to the thermal head. The heating resistors corresponding to the latched bits are selectively activated for heating during the period when an enable signal is fed by an enable signal generator 112 The data generator 109, the latch generator 111, and the enable signal generator 112 are controlled by a resistance measurement control circuit 108 in sync with the clocks from the clock generator 110.

A constant voltage is fed to the thermal head 100 through the VH and VL terminals from the constant voltage supply 101. The current flowing through the heating resistor is measured by a current detector 102 and is amplified by a differential amplifier 103. Then, the amplified current is adjusted to a predetermined current level by a level shift circuit 104. The level-shifted signal is converted into a digital signal through the effect of an analog-to-digital converter 105 which is driven by a sampling timing signal from the resistance measurement control circuit 108 synchronized with clocks from the clock generator 110. The digital signal is read by a buffer memory 106 so that it may be compared with a reference value pre-recorded in a ROM 107.

Next, a method for measuring a resistance will be described. The date generator 109 operates to generate such data as activating just one heating resistor and transfer it to the thermal head 100 The data is latched by a latch signal from the latch generator 111, when only the object heating resistor is activated by giving an enable signal from the enable signal generator 112 to the thermal head 100. The current flowing at this time is measured by the current detector 102, amplified and adjusted to a proper level current. Then, the current is sampled and then is analog-to-digital converted into a digital signal. Then, the measured value is written in the buffer memory 106. And, the data generator 109 operates to generate such data as activating each heating resistor in sequence. By writing each measured value at that time into the buffer memory 106 in sequence, the resistance of all the heating resistors are allowed to be measured.

Next, as to each heating resistor, it is checked
(1) if the measured value is made equal to or larger than a reference value pre-recorded in the ROM 107, and
(2) if the measured value of each heating resistor is changed as compared with the measured value of the adjacent heating resistor by a predetermined value.

If any one of them is determined to be affirmative, an error is indicated on the monitor (not shown) or by an alarm.

In the foregoing description, a constant voltage is fed from the constant voltage source to the thermal head. Alternately, a constant current source may be used so that it may feed constant current to the thermal head and a voltage between the VH and VL terminals may be measured. Further, the power source for the measurement may be used with the power source for printing or another one may be prepared so that either one of the power sources may be switched for using it. The level shift may use a proper value according to the range of the resistance to be measured. The clock generator, the latch circuit, and the enable generator may be used with the circuit for printing. They may be independently prepared so that they may be switched in use.

As for the lower linear density or the voids of the image caused along the printing direction of the printed image by the breaking of the heating resistors of the thermal head, in the above measurement, the disadvantage may be checked on whether or not the measured value stays in the allowable range. Or, by installing the line sensor along the direction perpendicular to the printing direction and integrating density data in the printing direction, the disadvantage may be detected on the integrated value.

In turn, the description will be oriented to a method for sensing a paper-jamming state caused by adhesion of the image receiving sheet to the dye transfer sheet in the thermal transfer printer with reference to FIG. 12.

Figure 12A:
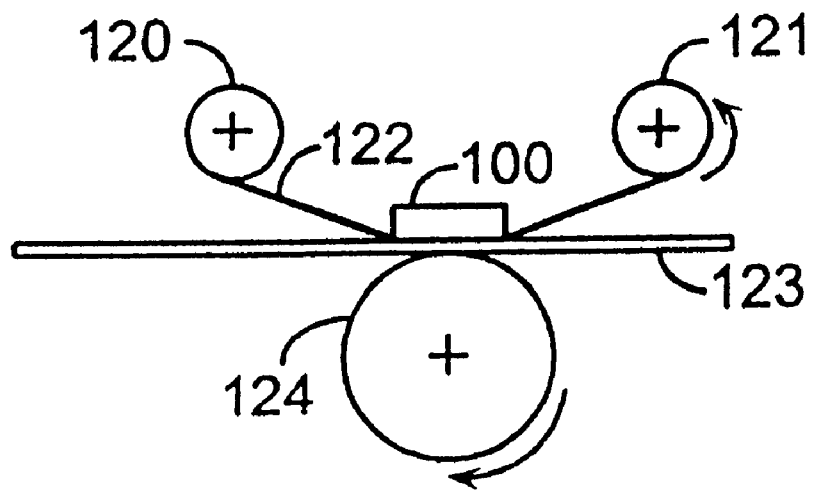
FIGS. 12(a)–12(b) is an explanatory view showing a method for sensing jamming executed in a thermal transfer printer.

FIG. 12A shows the normal state of these sheets, in which a thermal transfer sheet 122 unwound out of a feed roll 120 is pressed against a thermal head 100 with an image receiving sheet 123 laid therebetween by means of a platen roller 124 and heated according to image data and the recorded sheet is wound around a take-up roll 121 in sequence.

Figure 12B:
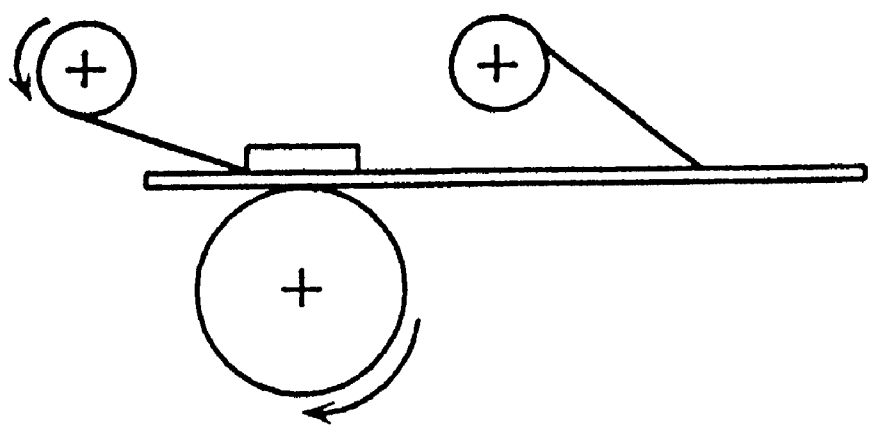

At a time, as shown in FIG. 12B, if the image receiving sheet is adhered by heat with the thermal transfer sheet, the sheet is not wound around the take-up roll 121 or the take-up roll lowers its rotation speed, thereby bringing about sheet jamming. If the jamming takes place as a result of adhesion of the image receiving sheet with the thermal transfer sheet, the platen roller is rotated, while the take-up roll 121 is not rotated or lowers its rotation speed. Hence, sheet jamming is sensed on the difference of the rotation speed between the platen roller and the take-up roll. Of course, it may be sensed from only the rotation speed of the take-up roll itself. If necessary, it may apply to jamming between a protective layer transfer sheet and the image receiving sheet.

FIG. 13 is an explanatory view showing how "out of thermal transfer sheet" is sensed in the thermal transfer printer.

Figure 13A:
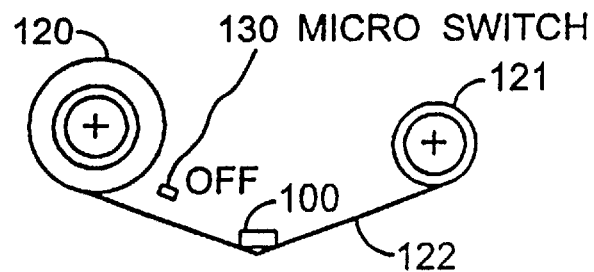
FIGS. 13(a)–13(b) is an explanatory view showing a film end of the thermal transfer printer.
Figure 13B:
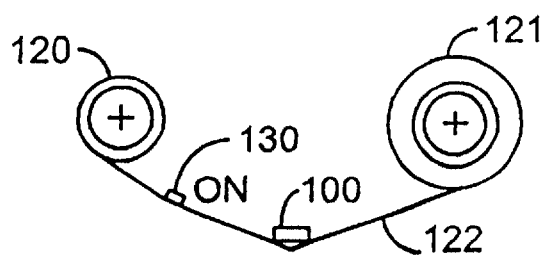

As shown in FIG. 13A, a micro switch 130 is located close to a feeding path of the thermal transfer sheet 122. As the thermal transfer sheet is being consumed, the diameter of the roll film in the feed roll 120 is made smaller. Thus, the travel path is gradually changed to the upward. At the end of the thermal transfer sheet, as shown in FIG. 13B, the thermal transfer sheet comes into contact with the micro switch for sensing "out of thermal transfer sheet".

Figure 14A:
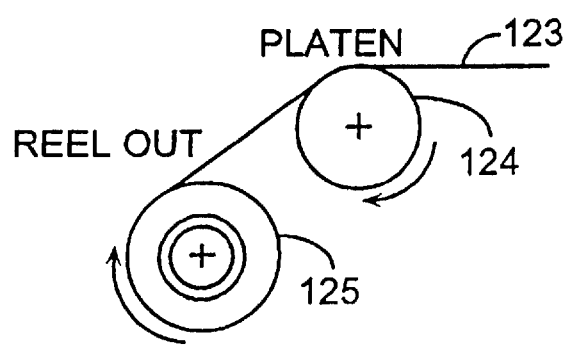
FIGS. 14(a)–14(c) is an explanatory view showing a paper end of the thermal transfer printer.
Figure 14B:
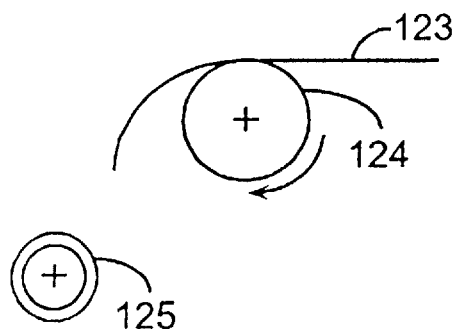
Figure 14C:
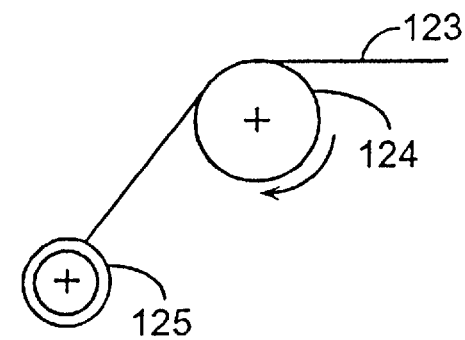

FIG. 14 is an explanatory view showing how "out of image-receiving sheet" is sensed in the thermal transfer printer.

In the normal state, as shown in FIG. 14A, the image receiving sheet is unwound from the feed roll so that the sheet may be pressed against the thermal head (not shown) with the dye transfer sheet (not shown) being overlapped therewith by the platen roller. When the image receiving sheet weakly adheres to a bobbin, if the sheet is out, the sheet is separated from the feed roll 125 as shown in FIG. 14B. As a result, no sheet is left around the fed roll 125, so that the feed roll 125 serves to stop its rotation while only the platen operates to rotate. When the image receiving sheet strongly adheres to the bobbin, if the sheet is out, the feed roll is constricted and stops its rotation while only the platen operates to rotate. Hence, by monitoring the rotations of both the roll and the platen, it is possible to detect that the image receiving sheet is out. Of course, by monitoring only the rotation of the feed roll 125, it is possible to detect that the image receiving sheet is out.

FIG. 13 concerns the dye transfer sheet and FIG. 14 concerns the image receiving sheet. The sensing method may apply to both of the dye transfer sheet and the image receiving sheet. Further, it may similarly apply to the protective layer transfer sheet.

As another method, to know the number of unused frames about the dye transfer sheet, the protective layer transfer sheet and the image receiving sheet, it is possible to take the steps of setting an input number of sheets to the counter when loading the sheets, decrement a count value each time one image is printed or detect a mark standing for a number of unused frames, the mark expressed on the sheet side at each one screen or at each constant number of screens, and decrementing the count value based on the sensed mark. Further, to know the user of used sheets, by incrementing the count value each time one image is printed out or sensing the mark standing for the left frames, the mark being attached on the sheet side, the used sheets can be grasped from the put number of images and the sensed number of left images.

Further, the rotation speed of the feed roll given when the sheet is unwound at a constant speed is sensed by a rotary encoder. In place, the roll diameter may be calculated from the rotation speed of the roll so as to estimate the left images or the used images.

Figure 15:
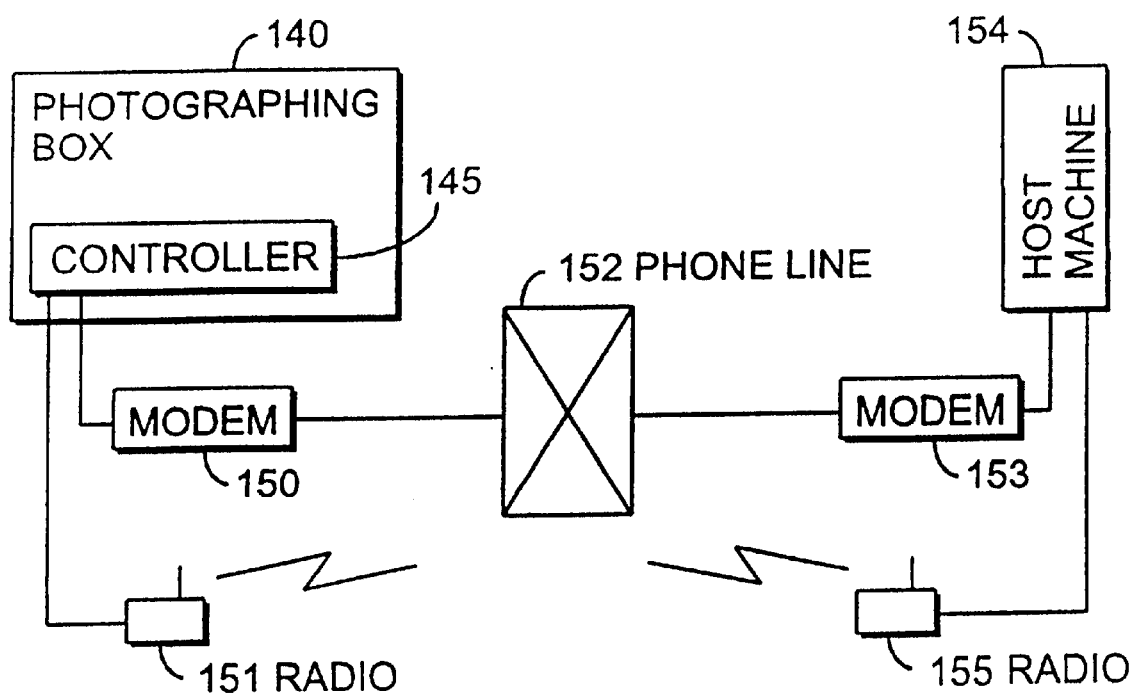
FIG. 15 is an explanatory view showing a photographing box.

FIG. 15 is an explanatory view showing a system for sensing some troubles such as a printer trouble, a burnt-out of a lighting lamp, or out of change in the money handling machine, occurring in the thermal transfer printer located in the photographing box shown in FIG. 1 and notifying the user of the sensed trouble.

If the thermal transfer printer is located in the photographing box, the controller 145 is located for controlling the overall photographing. Hence, with the foregoing method, it is possible to detect printer troubles such as an increased resistance or breaking the heating resistors of thermal head, out of sheets (image receiving sheet), out of films (dye transfer sheet), or jamming, read the sensed data in the controller, and notifying the monitoring side of the trouble.

Further, the controller 145 is connected to the money handling machine, the lighting lamp or the camera other than the printer. Hence, such a trouble may be sensed by a method for sensing if the changes are not left in the money handling machine by referring to the weight or for sensing the burnt-out of the lighting lamp by measuring the resistance. The sensed trouble is read in the controller and then is notified to the monitoring side.

As a method for sensing a burnt-out of the lighting lamp, by referring to the luminance data of the background obtained by photographing the object, if the luminance data is smaller than the set reference value, the burnt-out is sensed. Or, when the luminance data of the background at the previous photographing is stored in the memory, the stored luminance data is compared with the luminance data of the background of the photographed image, if the present read luminance data is lower than the value stored in the memory by a predetermined value, the burn-out is determined. In place, a light intensity sensor for measuring an intensity of light when photographing an object in the photographing space is provided for sensing if the lamp is burnt out.

In FIG. 15, the controller 145 for controlling the overall photographing system in the photographing box 140 may be connected to a modem 150. It any trouble takes place in any place in the photographing system, the trouble information is sent out from the controller 145 to a phone line 152 or through a radio machine 151. The trouble information sent out to the phone line 152 is read into a host machine 154 through the modem 153. Or, the trouble information sent out of the radio machine 151 is received by another radio machine 155 from which the information is read into the host machine 154.

In addition to giving a report about a trouble in the photographing box, it is possible to periodically report the used (sold) frames of the dye transfer sheet, the protective layer transfer sheet and the image receiving sheet or the number of left frames. Further, the informations in plural photographing boxes may be collected in a business station having the host machine located therein through the effect of the notice system.

As described above, the present invention enables to automatically monitor troubles such as an abnormal resistance of heating resistor of the thermal head, break of the thermal head, out of sheets, out of films, paper jamming, out of changes to be caused if the thermal transfer printer applies to a photographing box, and a burnt-out of the lighting lamp, so that the invention may rapidly and properly cope with those troubles.

In particular, if the thermal transfer printer is located in a self-service photographing box, any trouble can be grasped by a business station having a host machine located therein at e time when the trouble has occurred. Further, the invention may more minutely cope with the trouble by creating a failure occurrence real-time list or an individual failure history. Since the sold number of the pictures are easily grasped, the materials may be effectively supplemented to the frequently-used photographing box. Moreover, since the number of left images in the photographing box are easily grasped, it is possible to effectively make a schedule for supplementing proper materials or dispatch the persons through an efficient route, thereby suppressing the labor expenses consumed by the maintenance to a minimum.

Figure 16:
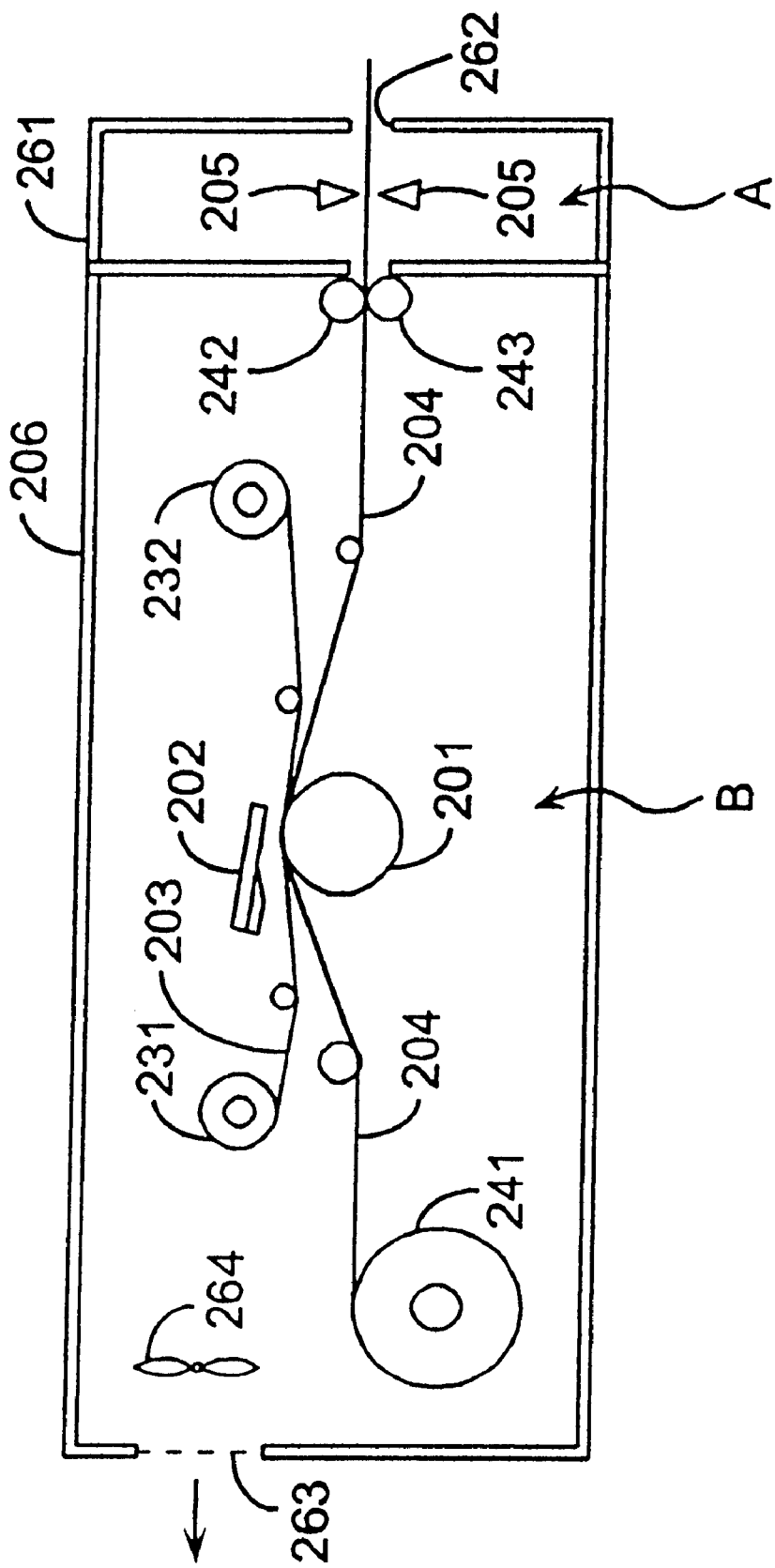
FIG. 16 is a schematic diagram showing a thermal transfer recording apparatus according to an embodiment of the present invention.

FIG. 16 is a schematic view showing a thermal transfer recording apparatus according to another embodiment of the present invention.

In FIG. 16, a numeral 201 denotes a platen roller. A numeral 202 denotes a thermal head located as opposed to the platen roller 201. A numeral 203 denotes a dye transfer sheet or a thermal transfer sheet to be unwound from a feed roll 231 and to be wound around a take-up roll 232. A numeral 204 denotes a image receiving sheet to be unwound from a roll 241. The dye transfer sheet 203 and the image receiving sheet 204 are loaded in a manner to be passed between the platen roller 201 and the thermal head 202, both of which are components of a printing mechanism. The thermal head 202 presses the dye transfer sheet 203 against the image receiving sheet 204, in which state the platen roller 201 is rotated for feeding the image receiving sheet 204 and the dye transfer sheet 203

The image data is transferred from the thermal head driving means (not shown) to the thermal head 202 in sync with a feed speed of the image receiving sheet 204 so that plural heating resistors may be activated according to the image date. The dye contained in the dye layer formed on the dye transfer sheet 203 is transferred on the image receiving sheet 204 for recording the image on the image receiving sheet 204. The image receiving sheet 204 printed by the printing mechanism is fed out between a pair of opposed sheet cutters 205 with the sheet 204 being laid between a pair of nip rollers 242 and 243 so that the sheet may be cut out at predetermined intervals.

The overall recording apparatus is held in a case 206 This case 206 comes into contact with the outside of the nip rollers 242 and 243. The case 206 is separated into a sheet-out section A and an image recording section B corresponding to the other portion by a partition 261 provided with a slit a through which the image receiving sheet 204 is passed. On the cover for covering the sheet cut portion A of the case 206, a paper ejecting slit 262 is provided. The image receiving sheet 204 cut by the sheet cutter 205 is ejected out of the slit 262. On the portion for covering the image recording section B, a filter 263 is provided. A fan 264 is installed inside of the image recording section B for cooling down the image recording section B and preventing intrusion of dirt from the outside into the image recording section B.

When the image is recorded by this recording apparatus, paper dust appears when the image receiving sheet 204 after the image is printed is cut by the sheet cutters 205. The paper dust is screened by the partition 261 so that the almost all of paper dust stays in the sheet cut portion A without being directly intruded to the image recording section 1. Since the image recording section B has a dust-preventing structure, the dirt from the outside is not intruded into the image recording section B. Hence, no paper dust or dirt adheres to the thermal head 201 of the image recording section 3, the platen roller 202, the dye transfer sheet 203, and the image receiving sheet 204 when recording an image.

As described above, the thermal transfer recording apparatus according to the present invention is separated into the sheet-cut portion and the image recording section by the partition having a slit through which the image receiving sheet is passed. Further, since the image recording section has a dust-preventing structure, no dust paper appearing in the sheet-cut portion or no dirt from the outside is intruded into the image recording section this makes it possible to prevent defective printing or printer failure.

Figure 17:
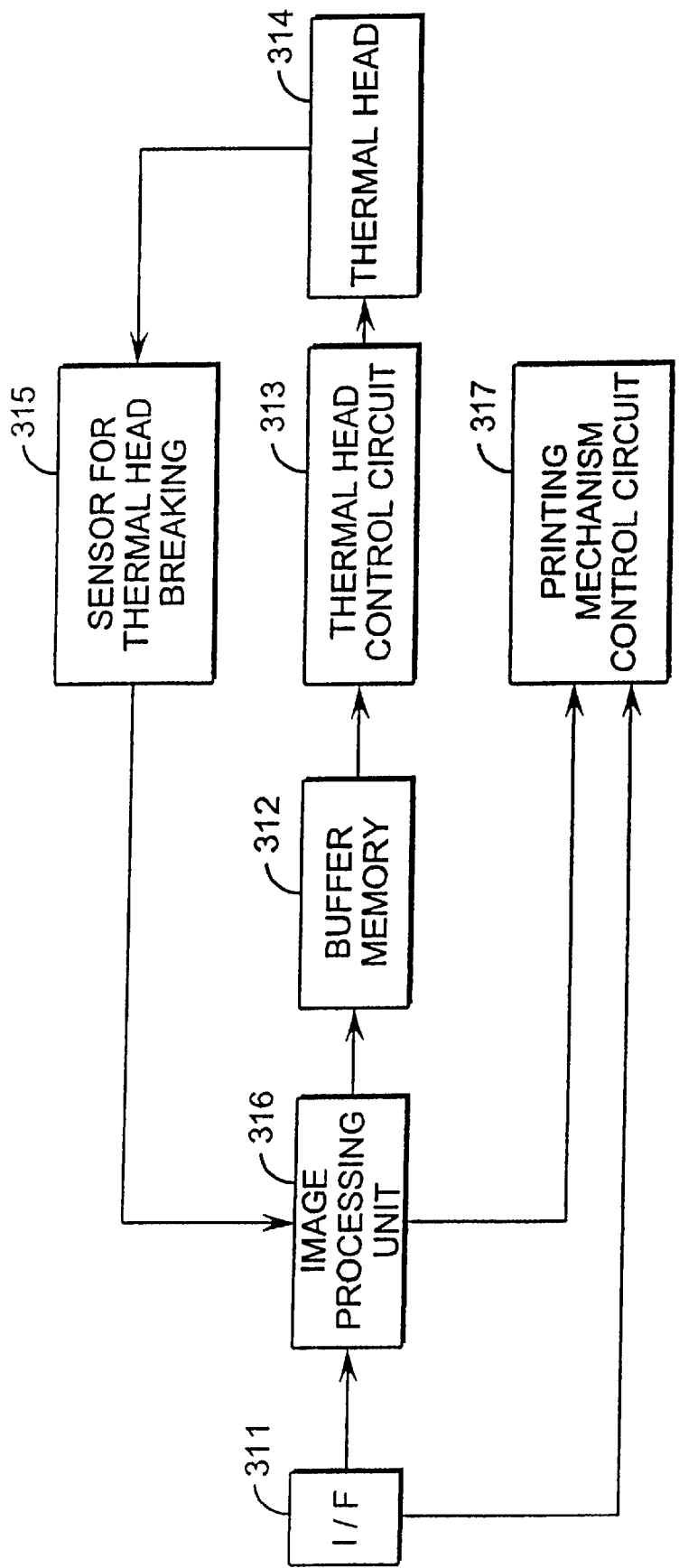
FIG. 17 is a block diagram showing an automatic layout mechanism according to an embodiment of the present invention.

FIG. 17 is a block diagram showing an automatic layout mechanism according to the present invention, which operates to change a layout for coping with an abnormal state of the thermal head. As is understood from the comparison between the present invention and the prior art shown in FIG. 10, there are provided a sensor for thermal head breaking 315, an image processing circuit 316 and a printing mechanism control circuit 317 in addition to an I/F 311, a buffer memory 312, a thermal head control circuit 313, and a thermal head 314 as included in the prior art.

Figure 18:
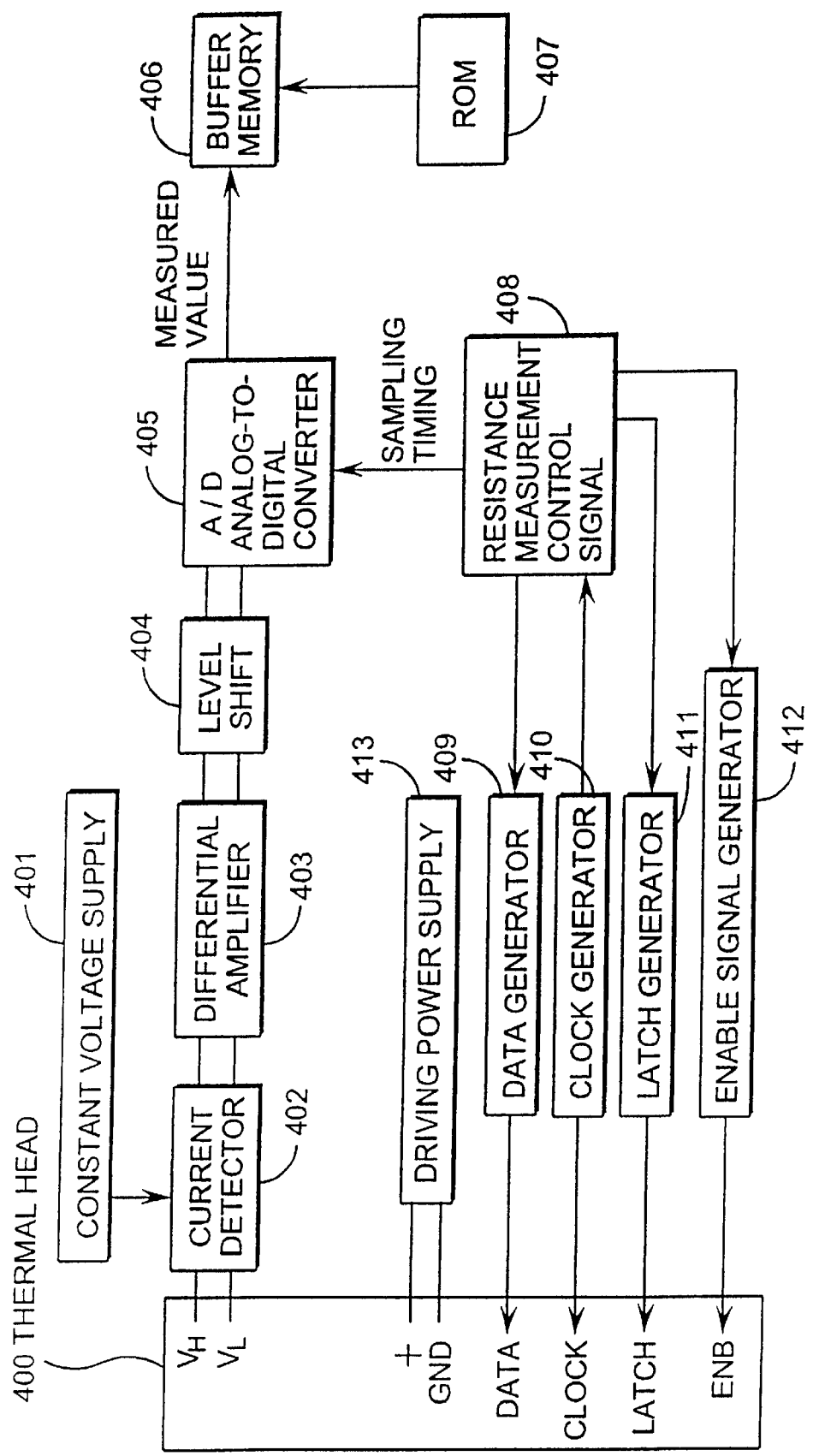
FIG. 18 is a block diagram showing a circuit for measuring a resistance provided in a circuit for sensing if the head is burnt out.

The sensor for thermal head breaking 315 provides a resistance measuring means and an abnormal resistance determining means for measuring a resistance of each heating resistor included in the thermal head. By comparing the measured resistance with a predetermined reference value and the resistances of the adjacent heating resistors with each other, an abnormal state is sensed on the compared result. A location of the heating resistor in which an abnormal state takes place is reported to, the image processing circuit 316. FIG. 18 shows a resistance measuring circuit included in the sensor for thermal head breaking 315.

The thermal head 400 contains a circuit for driving and controlling plural ones or each one of the heating resistors. The thermal head 400 is powered by a driving power supply 413 so that the thermal head 400 is driven in synchronous with clocks generated in a clock generator 410. A data generator 409 operates to generate such data as heating just one heating resistor and transfer the date to the thermal head 400. A latch generator 411 serves to generate a latch signal for latching data to be transferred to the thermal head. The heating resistor for the latched bit is selectively driven and heated during the period when an enable signal is given from an enable signal generator 412. The data generator 409, the latch generator 411 and the enable signal generator 412 are controlled by a resistance measuring control circuit 408 in sync with the clocks generated in the clock generator 410.

A constant voltage supply 401 operates to supply a constant voltage to the thermal head 400 at the VH and VL terminals. The current flowing through a heating resistor is measured by a current detector 402 and is amplified by a differential amplifier 403. The amplified current is adjusted to a predetermined current level by a level shift circuit 404. The level-shifted signal is converted into a digital signal through the effect of an analog-to-digital converter 405 which is driven in response to a sampling timing signal from the resistance measurement control circuit 408 synchronized with the clocks generated by the clock generator 410. The digital signal is read by a buffer memory 406 and is compared with a reference value pre-recorded in a ROM 407.

The resistance is measured as follows. At first, the data generator 409 operates to generate such data as heating just one heating resistor and transfer the data to the thermal head 400. The latch signal from the latch generator 411 is used for latching the data transferred to the thermal head 400. At a time, the enable signal from the enable signal generator 412 is fed to the thermal head 400 for activating only the necessary heating resistors. The current flowing at this time is measured by the current detector 402, amplified and level-adjusted. The level-shifted current is sampled and converted into a digital signal. The digital signal is written in the buffer memory 406. Then, the data generator 409 serves to sequentially generate such data as activating each heating resistor. The measured value of each activated heating resistor is sequentially written in the buffer memory 406 for measuring the resistances of all the heating resistors.

Next, as to each heating resistor, it is checked (1) if the actual measured value is compared with the reference value recorded in the ROM 407 and the actual measured value is changed as compared with the reference value by a predetermined value or more, and (2) if the actual measured value of a heating resistor is compared with that of the adjacent heating resistor and the former is changed as compared with the latter by e predetermined value or more.

If any one of them is determined to be affirmative, it is determined that an abnormal state takes place in the heating resistor. Then, a head breaking signal is input to the image processing circuit 316 shown in FIG 17.

In the foregoing description, the constant voltage supply operates to supply a constant voltage to the thermal head. In place, a constant current supply may be used for feeding constant current for measuring the voltage applied between the VH and VL terminals. Further, the power supply for measurement is used with the power supply for printing. Or, another power supply may be prepared so as to switch to a proper power supply. Further, for shifting the current level, a proper value is selected in the range of the resistances to be measured. In addition, the clock generator, the latch circuit and the enable signal generator may be used with those for printing. They may be prepared dedicatedly for the thermal head and switchably used.

The signal for sensing a head breaking is applied to the image processing circuit 316, in which the layout to be printed most efficiently is allowed to be calculated without using the abnormal heating resistor. The image signal based on the layout is input to the buffer memory 312. At a time, the printing control signal based on the layout is input to a printing mechanism control circuit 17 for changing controls of a motor for the dye transfer sheet and the platen roller. In place, it is possible to use a method for returning the signal for sensing head breaking from the head breaking sensing circuit 315 to the host computer through the I/F 311.

Figure 21:
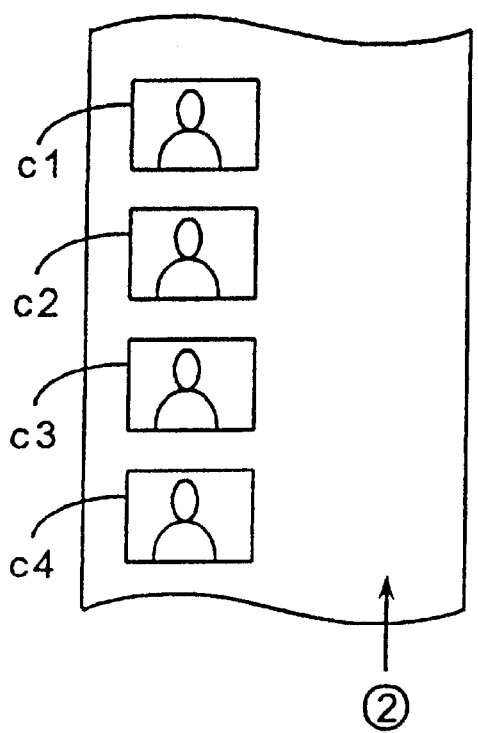
FIG. 21 is a view showing another change of an image layout.

Next, the description will be oriented to a change of a layout in the case of printing a combination of four certificate photos consisting of 2×2 frames at the four printing locations a1 to a4. If the abnormal heating resistor appears at the location close to a non-printing area between the two frames ranged in the width direction of the image receiving sheet as shown by (1) of FIG. 19, for example, the print area is shifted to the left in a manner to allow the abnormal heating resistor to shift to the non-printing area between the images as keeping a matrix consisting of 2×2 frames and print the images at the locations b1 to b4. If the abnormal heating resistor takes place at a place separated from the non-printing area as shown by (2) of FIG. 19, as shown in FIG. 21, the frames are rearranged as a matrix consisting of 4×1 frames as shown in FIG. 21 and are printed at the left-hand locations c1 to c4.

Figure 19:
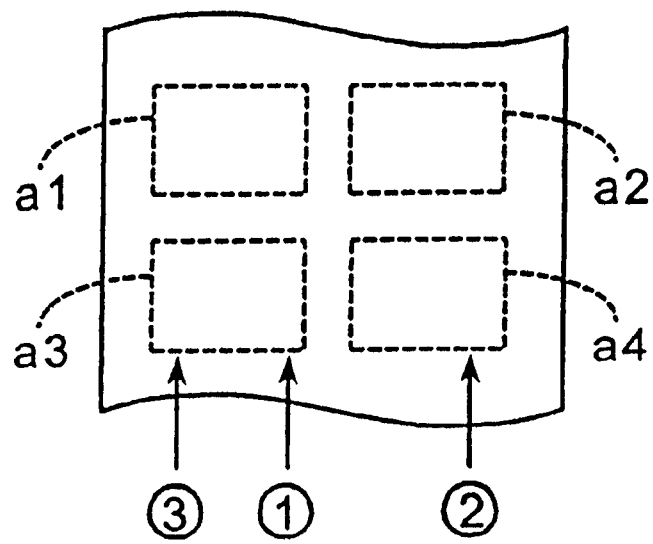
FIG. 19 is an explanatory view showing a location of a heating resistor in which an abnormality takes place.
Figure 20:
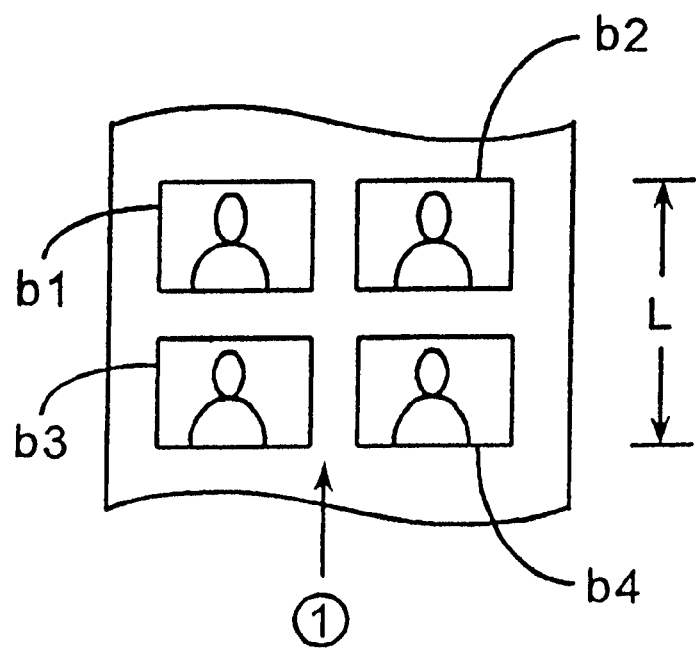
FIG. 20 is a view showing a change of an image layout.
Figure 22:
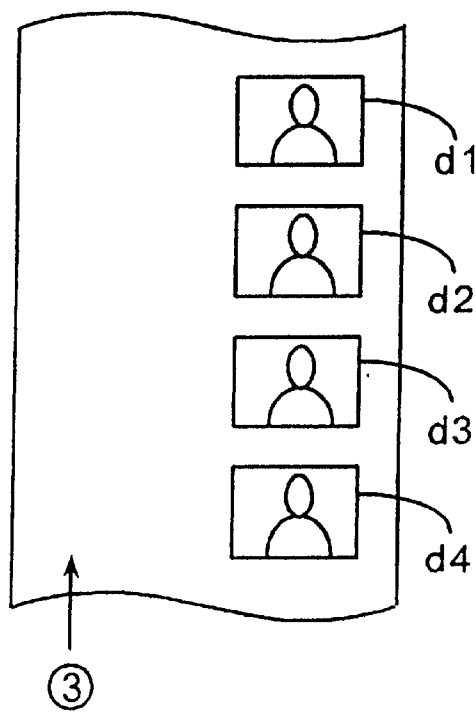
FIG. 22 is a view showing another change of an image layout.

If the abnormal heating resistor takes place at the H location indicated by (3) of FIG. 19, the frames are rearranged as a matrix consisting of 1×4 frames as shown in FIG. 22 and are printed at the right-hand locations d1 to d4. In a case that an abnormal state takes place at the location indicated by (2) (or (3) of FIG. 19, when the feeding length per one color of the dye transfer sheet corresponds to two frames as shown by L of FIG. 20, after forming the images at the locations c1 and c2 of FIG. 21 (or d1 and d2 of FIG. 22 ), the printing mechanism control circuit is functioned to form the images at the locations c3 and c4 (or d3 and d4 of FIG. 22 ) without ejecting the image receiving sheet. By changing the printed locations, the portions along the printing direction of the abnormal heating resistor are removed from the image portions. Hence, the desired images are allowed to be recorded.

As described above, according to the present invention, if an abnormal state takes place in the thermal head of the thermal transfer printer, the image layout is changed in a manner to activate only proper heating resistors to record images without using the abnormal heating resistor. Hence, if an abnormal state takes place, desired images are allowed to be serially recorded. Hence, the consumption of the dye transfer sheet and the image receiving sheet may be suppressed to a minimum. In particular, if the thermal transfer printer is located in a self-service photographing box, the present invention makes great contribution to avoiding a user's claim for a defective print.

Figure 23:
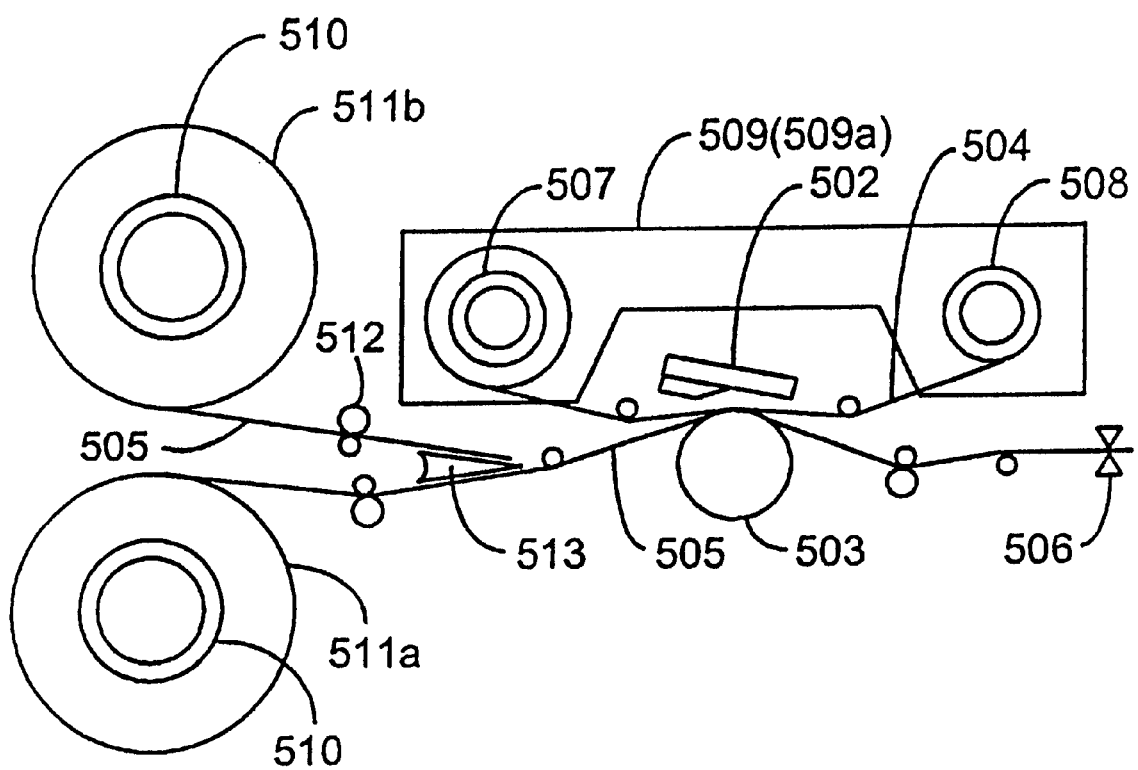
FIG. 23 is a schematic side view showing a thermal transfer printer according to an embodiment of the present invention.
Figure 24:
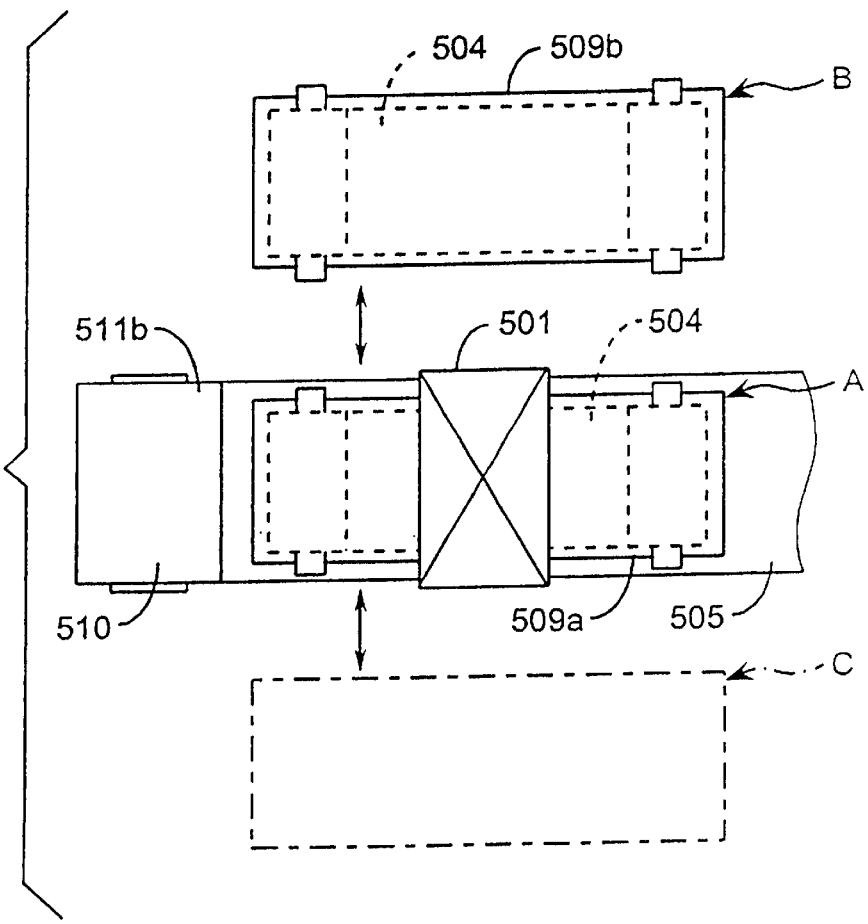
FIG. 24 is a schematic plane view showing the thermal transfer printer.

FIG. 23 is a schematic side view showing a thermal transfer printer according to another embodiment of the present invention. This printer provides a capability of taking measures of an "out of material" state. FIG. 24 is a schematic plan view showing the printer.

As shown in FIGS. 23 and 24, a thermal head 502 of a recording section 501 is located as opposed to a platen roller 503. A dye transfer sheet 504 and an image receiving sheet 505 are loaded in a manner to allow these sheets to be passed between the thermal head 502 and the platen roller 503. The image receiving sheet 505 is pressed on the thermal head 502 with the dye transfer sheet 504 laid therebetween, in which state the platen roller 503 is rotated to feed the dye transfer sheet 505 and the image receiving sheet 504. Energy is applied to the thermal head 502 in sync with the feeding speed of the image receiving sheet 505. The thermal head 502 serves to activate plural heating resistors according to the image data so that the image may be recorded on the image receiving sheet 505. A pair of cutters 506 operate to cut the printed sheet 505 at predetermined intervals and eject the cut sheet portions.

The dye transfer sheet 504 is held in a cassette case 509 in the state that the sheet 504 is tensed around a feed roll 507 and a take-up roll 508. Two cassette cases 509a and 509b are loaded to an A location and a B location as shown in FIG. 23 as being set to an exchanging means (not shown) These cassette cases are supported in a manner to be movable between the recording location for the recording section 501 and the waiting location located on the side of the recording section 501. That is, the exchanging means of the dye transfer sheet 504 operates to reciprocate one cassette case 509a between the A and the C locations, while it operates to reciprocate the other cassette case 509b between the B location and the A location as being interlocked with the reciprocation of the cassette 509a.

The image receiving sheet 505 is wound around a bobbin 510. Two rolls 511a and 505b are loaded to the printer. As viewed in FIG. 23, the image receiving sheet 505 is unwound from the lower roll 511a end is used for recording an image, while the image receiving sheet 505 wound around the upper roll 511b is in the waiting state. That is, the image receiving sheet 505 is slightly unwound from the upper roll 511b. The tip of the image receiving sheet 505 is set to an exchange plate 513 through a nip roller 512.

Figure 25A:
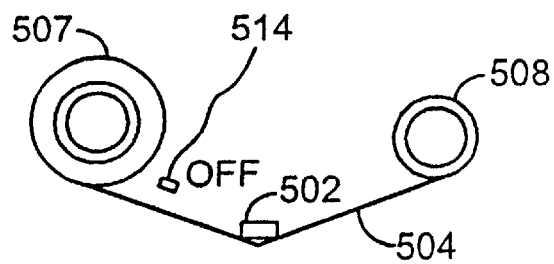
FIGS. 25(a)–25(b) is an explanatory view showing means for sensing if the dye transfer sheet is out.
Figure 25B:
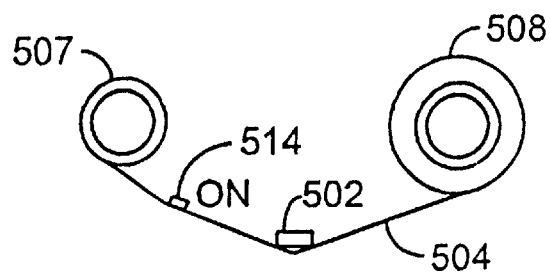

FIG. 25 is an explanatory view showing means for sensing if the dye transfer sheet 504 (material) is out As shown in FIG. 25A, a micro switch 514 is located close to a feeding path of the dye transfer sheet 504. As the dye transfer sheet 504 is being consumed, the diameter of the feed roll 507 is made smaller, thereby slightly displacing the feeding path toward the upward. At the end of the roll, the dye transfer sheet 504 comes into contact with the micro switch 514 as shown in FIG. 25B for sensing that the dye transfer sheet 504 is out.

Figure 26A:
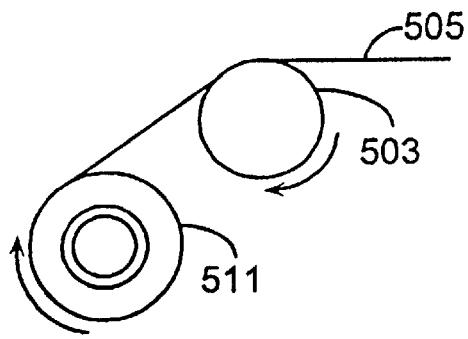
FIGS. 26(a)–26(c) is an explanatory view showing means for sensing if the image receiving sheet is out.
Figure 26B:
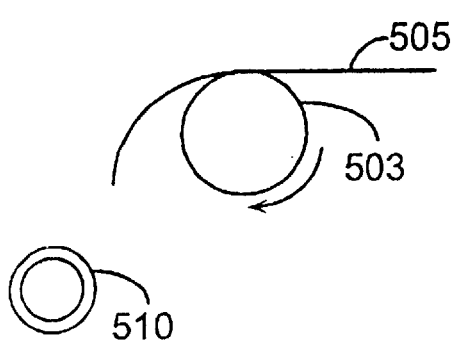
Figure 26C:
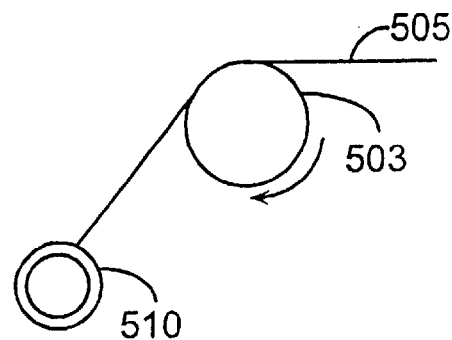

FIG. 26 is an explanatory view showing means for sensing if the image receiving sheet 505 is out. In the normal time, as shown in FIG. 26A, the image receiving sheet 505 together with the dye transfer sheet (not shown) is unwound from the roll 511 so that the image receiving sheet 505 is pressed on the thermal head by the platen roller 503. If the image receiving sheet 505 weakly adheres to the bobbin 510, at the end of the roll, the image receiving sheet 505 is separated from the bobbin 510 as shown in FIG. 26B, Hence, the bobbin 510 becomes idle and stops its rotation Only the platen roller 503 is rotated. If the image receiving sheet 505 strongly adheres to the bobbin 510, at the end of the roll, the bobbin 510 is constrained and stops its rotation as shown in FIG. 26C. This results in leaving only the platen roller 503 rotated. In any case of weak adherence and strong adherence, the rotation of the bobbin 510 is stopped and only the platen roller 503 is rotated By monitoring both of the rotations, it is possible to sense that the image receiving sheet 505 is out. Alternately, by monitoring only the rotation of the bobbin 510, it is possible to sense that the material is out.

FIG. 25 shows means for sensing "out of material" of the dye transfer sheet 504. FIG. 26 shows means for sensing "out of material" of the image receiving sheet 505. Any one of the sensing means may apply to the dye transfer sheet 504 or the image receiving sheet 505. In place, by counting the number of the used frames of the dye transfer sheet 504 or the image receiving sheet 505 or sensing an end mark attached on the dye transfer sheet 504 or the image receiving sheet 505, the "out of material" about each of the sheets is sallowed to be sensed.

The exchange of the dye transfer sheet 504 or the image receiving sheet 505 is executed by sensing complete or substantial "out of material" about each of these sheets. In this case, both are not required to be exchanged at a time. If the exchange of both of the sheets 504 and 505 is constantly done at a time, it is possible to provide means for sensing if the material is out for either one of the dye transfer sheet 504 and the image receiving sheet 505.

Next, when sensing the material is used up (out), the spontaneous exchange of the dye transfer sheet 504 and the image receiving sheet 505 will be described below.

When the image is recorded in the state as shown in FIGS. 23 and 24 and it is sensed that the dye transfer sheet 504 or the image receiving sheet 505 is used up (out), the exchanging means of the dye transfer sheet 504 is driven in response to the sensed result. The used cassette case 509A located at the A location is moved to the C location. The cassette case 509B located at the B location is moved to the A location. At a time, the lest part of the image receiving sheet 505 in the roll 511a is wound around the bobbin 510 or fed out. Then, the nip rollers 512 operate to unwind the image receiving sheet 505 from the roll 511b. With the material exchanged by the above operation, the image printing is allowed to be continued. At each periodic checking time, the cassette case 509A at the C location and the lower roll 511a are exchanged with the new ones After the image printing is proceeded further in this state, it is sensed that the dye transfer sheet 504 or the image receiving sheet 505 is used up, the used-up cassette case 509b located at the A location is moved to the B location and a new cassette case located at the C location is moved to the A location. At a time, the image receiving sheet is unwound from the new roll so that the exchanged material is used for the further printing. At each periodic checking time, the cassette case located at the B location and the upper roll 511b are exchanged with the new ones. The repetition of this cycle makes it possible to continue the printing with the materials being continuously fed.

Figure 27:
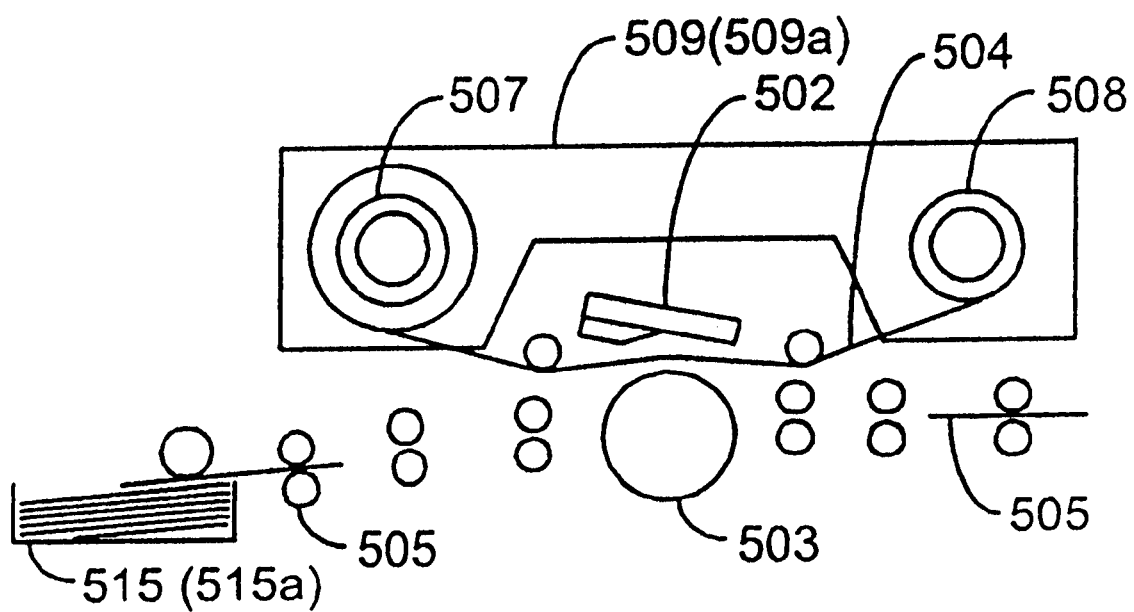
FIG. 27 is a schematic side view showing a thermal transfer printer according to another embodiment of the present invention.
Figure 28:
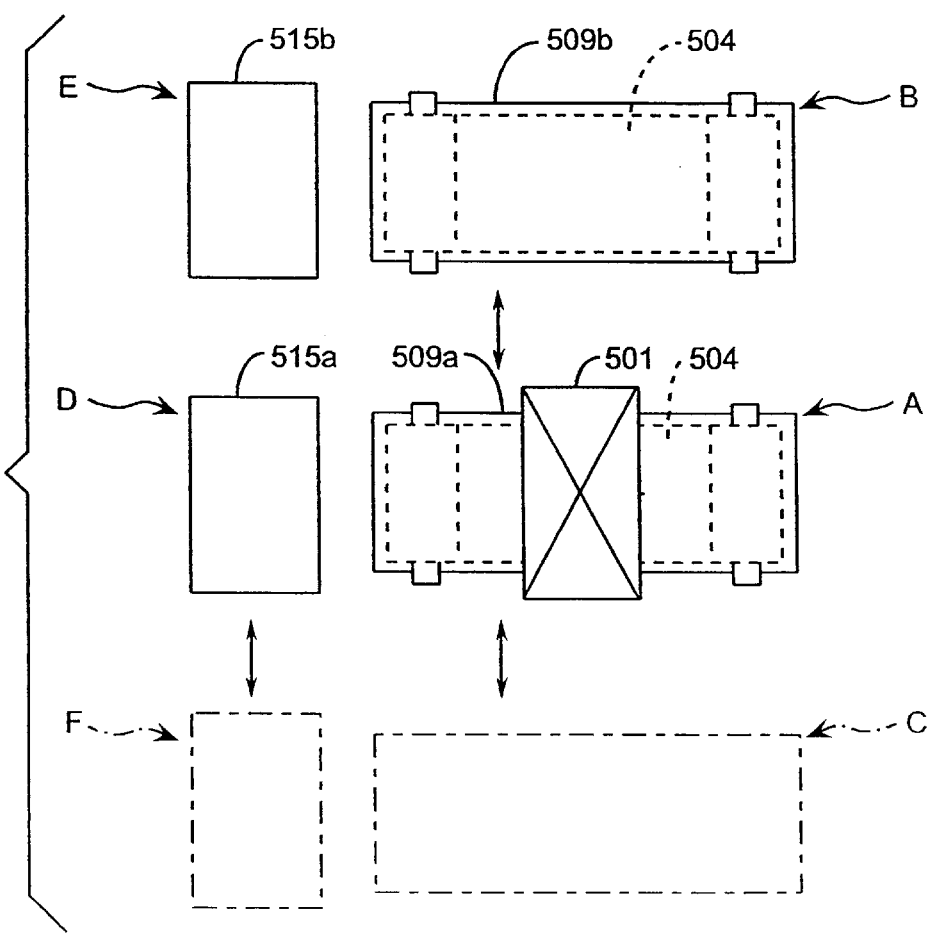
FIG. 28 is a schematic plane view showing the thermal transfer printer.

FIG. 27 is a schematic side view showing a thermal transfer printer according to another embodiment of the present invention. FIG. 28 is a schematic plane view showing the printer.

Like the previously described embodiment, the printer of this embodiment uses the dye transfer sheet 504 housed in the cassette case 509. Two such cassette cases 509a and 509b are loaded. As the image receiving sheet 505, there is used a leaf-like sheet integrated in a stacker 515. Two stackers 515a and 515b are loaded to the D and the F locations as shown in FIG. 28 in the state that they are set to the exchanging means (not shown). The stackers is supported in a manner to allow each of the stackers to reciprocate between the recording location for the recording section and the waiting location on the side of the recording section 501.

That is, the exchanging means of the image receiving sheet 505 allows one stacker 515a to reciprocate between the D and the E locations, while the exchanging means allows the other stacker 515b to reciprocate between the E and the D locations as being interlocked with the reciprocation of the stacker 515a. Then, the means for sensing that the dye transfer sheet 504 is used up is the same as the above means. The method for sensing that the image receiving sheet 505 is used up is executed by sensing if the sheet in the stacker 515 is left through the effect of a passing sensor.

In this embodiment, the exchange of the dye transfer sheet 504 and the image receiving sheet 505 is executed by sensing that the material is completely or substantially out by the sensing means provided for each of the sheet. In this case, like the previous embodiment, it is not necessary to exchange both of the sheets with each other at a time. If the exchanges of the dye transfer sheet 504 and the image receiving sheet 505 are constantly executed at a time, it is also possible to provide means for sensing that the material is out for either one of the dye transfer sheet 504 and the image receiving sheet 505.

The description will be oriented to the spontaneous exchanges of the dye transfer sheet 504 and the image receiving sheet 505 when sensing the material is out In the states shown in FIGS. 27 and 28, the image is recorded. If it is sensed that the dye transfer sheet 504 or the image receiving sheet 505 is used up, the means for exchanging the dye transfer sheet 504 is driven so that the used-up cassette case 509a located at the A location is moved to the C location and the cassette case 509b located at the B location is moved to the A location. At a time, the exchanging means of the image receiving sheet 505 is driven so that the used-up stacker 515a located at the D location is moved to the F location and the stacker 515b located at the E location is moved to the D location. With the material exchanged by such an operation, the printing is continued. At each periodic checking time, the cassette case 509 a located at the C location is replaced with the new one and the image receiving sheet 505 is filled in the stacker 515a located at the F location.

When the printing is proceeded in this state and it is sensed that the dye transfer sheet 504 or the image receiving sheet 505 is used up, the used-up cassette case 509 located at the A location is moved to the B location and the new cassette case located at the C location is moved to the A location, while the stacker 515b located at the D location is moved to the E location and the sheet-filled stacker 515a located at the F location is moved to the D location. With the exchanged materials, the printing is proceeded. At each periodic checking time, the cassette case 509b located at the B location is replaced with the new one and the image receiving sheet is filled in the stacker 515h located at the E location. By repeating this cycle, the printing is continued as the material is continuously being fed.

As described above, the thermal transfer printer according to the present invention is arranged to load plural heat transfer sheets and plural heated transfer Sheets and provide means for sensing if at least one of both of the sheets is out and means for automatically exchanging the dye transfer sheet and the image receiving sheet based on the sensed result. If, therefore, the dye transfer sheet or image receiving sheet is used up while the image is being recorded on the sheet, the printer operates to automatically exchange the materials with the new ones on the sensed result, thereby allowing the material to be continuously fed for proceeding the printing. In particular, in the self-service System for printing an image, the maintenance load is reduced, thereby making the promoting cost of the system lower as well.

What is claimed is:

1. A thermal transfer printer having means for feeding a plurality of thermal transfer sheets and a plurality of image receiving sheets respectively, a platen roller located on the feeding path of the dye transfer and image receiving sheets, and a recording section having a thermal head composed of plural heating resistors to be selectively activated according to image data for recording the image on the image receiving sheets in the state of forcing each thermal transfer sheet and each image receiving sheet being fed to be pressed on the surface of said thermal head by said platen roller, comprising:

means for detecting when at least one of the thermal transfer and image receiving sheets being recorded are out, and means for automatically exchanging the thermal transfer or image receiving sheets with new sheets based on the detected result.

* * * * *